(12) United States Patent
Chew et al.

(10) Patent No.: US 8,156,495 B2
(45) Date of Patent: Apr. 10, 2012

(54) SCHEDULING THREADS ON PROCESSORS

(75) Inventors: Jonathan J. Chew, San Francisco, CA (US); Eric Christopher Saxe, Livermore, CA (US)

(73) Assignee: Oracle America, Inc., Redwood City, CA (US)

(*) Notice: Subject to any disclaimer, the term of this patent is extended or adjusted under 35 U.S.C. 154(b) by 1120 days.

(21) Appl. No.: 12/016,132

(22) Filed: Jan. 17, 2008

(65) Prior Publication Data

US 2009/0187915 A1 Jul. 23, 2009

(51) Int. Cl.
*G06F 9/46* (2006.01)
(52) U.S. Cl. ....................................... 718/102
(58) Field of Classification Search ............... 718/102
See application file for complete search history.

(56) References Cited

U.S. PATENT DOCUMENTS

| | | | | |
|---|---|---|---|---|
| 5,745,778 A * | 4/1998 | Alfieri | | 712/1 |
| 6,105,053 A * | 8/2000 | Kimmel et al. | | 718/105 |
| 6,289,369 B1 * | 9/2001 | Sundaresan | | 718/103 |
| 7,313,795 B2 | 12/2007 | Chew et al. | | |
| 2002/0087652 A1 * | 7/2002 | Davis et al. | | 709/213 |

OTHER PUBLICATIONS

Sun Microsystems Documentation, "processor_bind(2)" <http://docs.sun.com/app/docs/doc/816-5167/6mbb2jaje?a=view> last revised Jul. 14, 2000, 3 pages.
Chew, Jonathan, "Memory Placement Optimization (MPO)" <http://opensolaris.org/os/community/performance/mpo_overview.pdf> Jun. 13, 2005, 33 pages.
Chew, Jonathan, "Memory Placement Optimization (MPO)" <http://opensolaris.org/os/community/performance/numa/mpo_update.pdf> Jul. 12, 2006, 49 pages.
Sun Microsystems Documentation "pset_create(2)" <http://docs.sun.com/app/docs/doc/817-5439/6mkt6nsj8?l=en&a=view&q=pset_create> last revised Jan. 10, 1997, 3 pages.
Laux, Dr. Matthias, "Solaris Processor Sets Made Easy" <http://developers.sun.com/solaris/articles/solaris_processor.html> Jun. 2001, 7 pages.
Sun Microsystems Documentation "semop(2)" <http://docs.sun.com/app/docs/doc/816-5167/6mbb2jaje?a=view> last revised May 12, 2006, 6 pages.

* cited by examiner

*Primary Examiner* — Thomas Lee
*Assistant Examiner* — Xuxing Chen
(74) *Attorney, Agent, or Firm* — Osha • Liang LLP

(57) ABSTRACT

A device, system, and method are directed towards managing threads and components in computer system with one or more processing units. A processor group has an associated hierarchical structure containing nodes that may correspond to processing units, hardware components, or abstractions. The processor group hierarchy may be used to assign one or more threads to one or more processing units, by traversing the hierarchy based on various factors. The factor may include load balancing, affinity, sharing of components, loads, capacities, or other characteristics of components or threads. A processor group hierarchy may be used in conjunction with a designated processor set.

20 Claims, 10 Drawing Sheets

SCHEDULING THREADS ON PROCESSORS

FIELD OF THE INVENTION

The present invention relates generally to computer systems and, more particularly, but not exclusively to the management of threads in a multiprocessor computer system.

BACKGROUND OF THE INVENTION

Advances in computer technology have led to increasing numbers of components being placed on a computer chip. Processor architecture has advanced from having one processor per chip to having multiple processors on a computer chip. Each processor may be multi-stranded. In a multi-stranded processor, two or more hardware threads of execution (strands) may concurrently exist on the processor. In some multi-stranded architectures, two or more hardware threads executing on a processor may each have their own registers, while functional units, such as an execution unit, are shared. In a processor configured for chip multiprocessing (CMP), two or more processor cores exist on the same processor chip. While each core may have a first level cache, the cores may share a second level cache. Strands from a first core execute independently of strands from a second core, though they may interact through shared memory, including the second level cache. A processor may combine chip multiprocessing and hardware multi-stranding, having two or more multi-stranded cores on a single processor.

Moreover, processor chips may now have one or more processor cores, hardware threads of execution (strands), execution pipelines, caches, pipes to caches, pipes to memory, floating point units, and other processor components. Components may be related in various ways, and associated with other components in one-to-one, one-to-many, or many-to-many associations. For example, multiple hardware threads may be associated with a single core, a core and a first level cache may be associated with each other, and multiple cores may be associated with a second level cache. A core may have exclusive use of an associated floating point unit, or multiple cores may share access to a floating point unit.

The increased complexity of computer processors may add complexity to software and logic that manages access to the various components on a multiprocessing system. One technique that has been employed to manage resource allocation is the use of processor sets. Processor sets is an abstraction provided by an operating system that allows a program to designate a set of processors and assign software threads to run on the specified set. While adding complexity to the application program, this mechanism is limited in its ability to control the numerous aspects of a multiprocessor system, or adapt to variations in multiprocessor architecture.

Generally, it is desirable to employ improved techniques for assigning software threads to hardware components, and grouping components in a computer system, and in particular a multi-stranded computer system. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
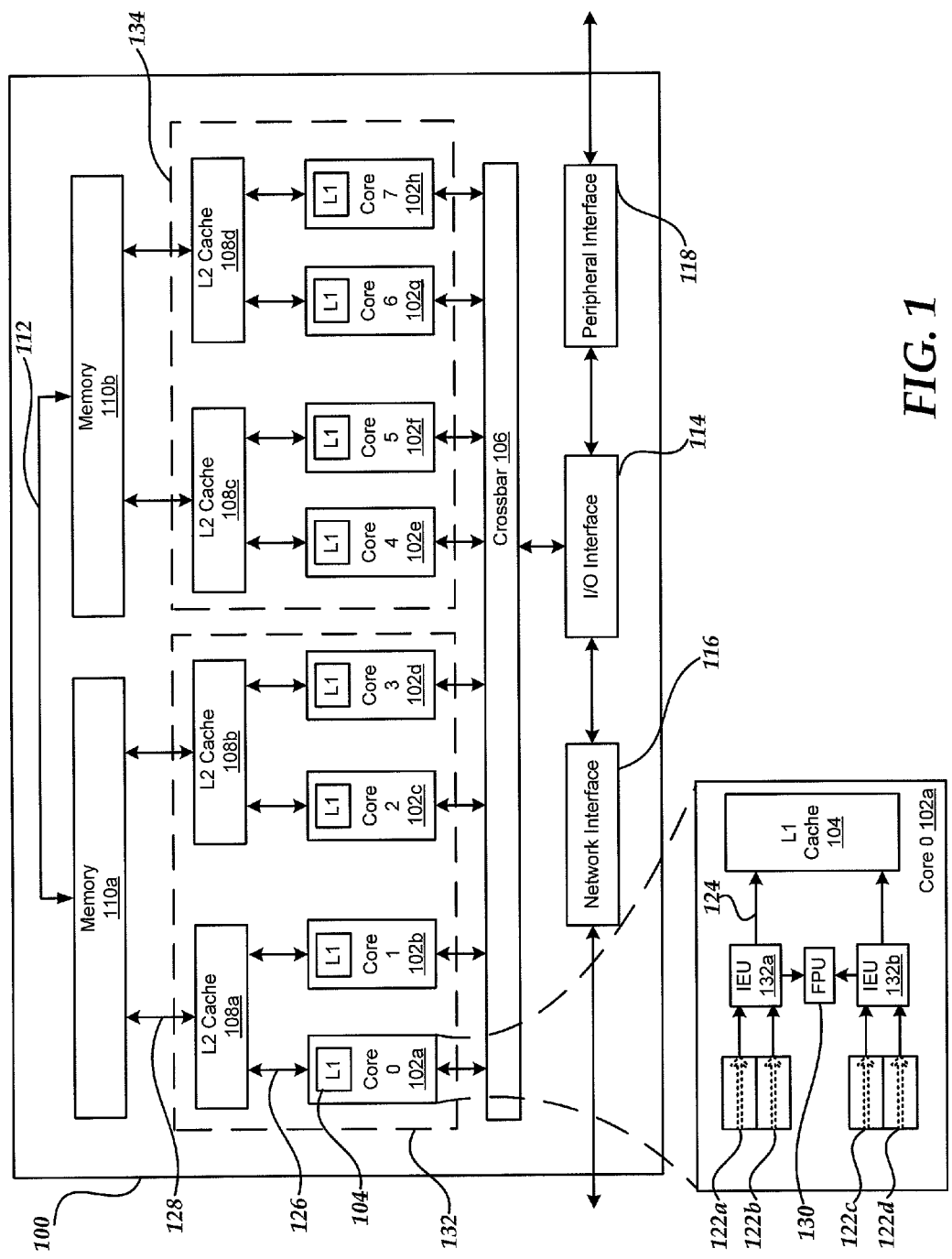
FIG. 1 is a block diagram illustrating one embodiment of a multiple core, multi-stranded processor system.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processing unit" may refer to a processor core, a CPU, a strand, or other such processing component within a processor.

As used herein, the term "proper subset" refers to a non-empty subset that contains less elements than the entire set. If A is a proper subset of B, B contains at least one member that is not in A.

As used herein, the term "hardware resource" (HR) refers to a hardware component or class of hardware components that is limited in its availability. Generally a hardware resource may be allocated by a controlling mechanism, such as an operating system kernel. A floating point unit is an example of a hardware resource. As used herein, the term "instance" of a hardware resource refers to a specific component of the class of hardware resource referred to. Different instances of a hardware resource may be, but are not necessarily, identical.

As used herein, the terms "traverse" and "traversal" refer to movement along paths of a graph structure in any direction.

As used herein, the term "thread" refers to a software thread of execution, unless it is described as a "hardware thread" or the context clearly indicates a reference to a hardware thread. The terms "hardware thread" and "strand" are equivalent. The terms "multi-stranded" and "hardware multithreaded" are equivalent.

Chip Multi-Processing (CMP) refers to a processor architecture in which there are multiple processor cores per processor chip. Symmetric multi-threading (SMT) refers to a processor architecture in which a processor core has multiple hardware threads of execution. Chip Multi-Threading (CMT) refers to a processor architecture having multiple processor cores per processor chip and multiple hardware threads of execution per core. Thus, CMT may be considered to be a combination of CMP and SMT.

In an architecture having multiple processing units on a processor chip, the processing units typically share one or more hardware components, and the sharing can affect the overall performance of the processing units on the chip. For example, two hardware threads may share an execution pipeline, one or more cache components, a memory component, or the like. Two cores may share cache components, connections to cache or memory, a memory component, or the like. Contention over these shared components may adversely affect the performance of the processing units. Constructive sharing and reuse of the shared components may improve performance.

By maintaining an awareness of performance relevant hardware sharing relationships between processing units on a chip, an operating system may employ techniques that improve performance. Such techniques are disclosed herein.

Briefly stated, the present invention is directed toward a computer-based mechanism for managing threads and processing units in a computer system having multiple processing units. Mechanisms of the invention may include obtaining characteristics and information relating to processing units, and other processor components, as well as the system architecture. In one aspect of the invention, the information may be used to create a graph, such as a hierarchical structure, representative of hardware sharing relationships. In one embodiment, the graph is used to assign one or more software threads to processing units, by traversing the graph in one of a variety of ways. The graph may be a directed acyclic graph.

In one aspect of the invention, one or more threads may be assigned to one or more processing units by balancing loads on shared components. The graph may be descended generally from one or more nodes representative of a low amount of sharing toward one or more nodes that represent a high amount of sharing, assigning one or more threads to branches or nodes of the graph based on one or more load balancing factors, including characteristics and information of processor components.

In one aspect of the invention, one or more threads may be assigned to one or more processing units by considering an affinity between threads, between a thread and itself during different execution cycles, or between a thread and a hardware component. The graph may be ascended generally from nodes representative of a high amount of sharing toward nodes that represent a lower amount of sharing, in order to select one or more shared components, providing a possible benefit when an affinity exists between a thread and another thread or processing unit.

In one aspect of the invention, a processor configuration manager may create a graph structure that includes a plurality of nodes and connections or paths between nodes. Each node may correspond to a component of the processor, and paths may represent relationships between components. A node may represent a component that is associated with one or more CPUs.

In one aspect of the invention, a thread scheduler may associate a thread with a processing unit by traversing the graph structure. This may include balancing threads and their load across processing units by descending the graph structure from one or more nodes representative of a low amount of component sharing toward one or more nodes representative of a high amount of component sharing.

In one aspect of the invention, a thread scheduler may assign a thread to a processing unit based on an affinity of the thread with itself, a second thread, or a processing unit. The processing unit may be one upon which the thread or the second thread has recently executed, or on which the second thread is concurrently executing.

In one aspect of the invention, the thread scheduler may selectively traverse the graph structure to a node corresponding to a cache, and selectively associate a thread with a processing unit that shares the cache with a second processing unit that has an affinity with the thread. The thread scheduler may traverse the graph structure by ascending the structure toward nodes representing less sharing and descending the structure toward nodes representing more sharing.

In one aspect of the invention, a processing unit grouping abstraction is provided. This can be used for managing processing units and threads. The invention may be used to represent the performance relevant hardware sharing relationships within a CMT processing chip and across multiple CMT processing chips. The invention may be used to assign threads to processing units in order to balance a load across shared components, and to facilitate constructive sharing of components. Aspects of the invention may be used to represent arbitrary groups of processing units, such as CPUs within a processor set.

Some aspects of the invention may enable an operating system to abstract at least some of the complexities of the underlying hardware away from applications. The abstractions may allow the operating system to optimize for platform specific characteristics in platform independent resource managing kernel subsystems, such as a thread scheduler.

In one aspect of the invention, mechanisms for assigning threads to processing units are performed by an operating system, enabling the operating system to provide a globally optimal resource management strategy. Additionally, an operating system may have an awareness of changes in resource availability and characteristics, particularly in environments in which resources can be dynamically configured, further enabling such mechanisms of the operating system.

Illustrative Operating Environment

FIG. 1 shows one embodiment of a system 100 having multiple processor cores, each core configured to be multi-stranded, in accordance with one embodiment of the invention. System 100 has a CMT architecture. The embodiment of system 100 illustrated in FIG. 1 may be used to implement all, or a portion of, methods of the present invention and associated methods. System 100 may include many more components than those shown. It may also have less than all of those shown. The components shown, however, are sufficient to disclose an illustrative embodiment for practicing the invention. One or more processor chips, and software instructions described herein, may be used to implement various embodiments of methods of the present invention.

As illustrated, system 100 includes multiple processor cores 102a-h, which are designated "Core 0" through "Core 7," respectively. Each of cores 102a-h connects to a corresponding first level (L1) cache 104, which holds recently or frequently used data or instructions for expedited retrieval by the core. Each of cores 102a-h is coupled to a corresponding level 2 (L2) cache 108a-d. In the illustrated configuration, each of cores 102a-h shares an L2 cache with one other core, such that cores 0-1 (102a-b) are coupled to L2 cache 108a, cores 2-3 (102c-d) are coupled to L2 cache 108b, cores 4-5 (102e-f) are coupled to L2 cache 108c, and cores 6-7 (102g-h) are coupled to L2 cache 108d. Each of L2 caches 108a-d may be configured to cache instructions or data for use by corresponding cores 102a-h.

In the illustrated configuration, each of L2 cache components 108a-d is coupled to a memory component, and shares the memory component with one other L2 cache component. As illustrated, L2 caches 108a and 108b are coupled to memory 110a; L2 caches 108c and 108d are coupled to memory 110b. A variety of other configurations may be employed, such that more or less than two cores are coupled to each L2 cache, or more or less than two L2 caches may be coupled to each memory component. In one configuration, L2 caches may be coupled to corresponding banks of a memory, or cores may be coupled to corresponding separately addressable banks of L2 cache. Banks of memory or L2 cache may be independently accessed, such that in the absence of conflicts, each bank may concurrently return data to a respective core. In one embodiment, a crossbar, such as crossbar 106, may be used to couple cores to L2 cache, or L2 caches to memory. In FIG. 1, connections 126 represent connections between cores and respective L2 cache components, and connections 128 represent connections between L2 cache components 108a-d and corresponding memory components 110a-b, though these connections may be implemented in a variety of ways. These connections may also be referred to logically as "pipes."

Additionally, in the illustrated embodiment, crossbar 106 couples cores 102a-h to input/output (I/O) interface 114, which is in turn coupled to a network interface 116 and a peripheral interface 118. I/O interface 114, peripheral interface 118, and network interface 116 may couple system 100 to boot and/or service devices, peripheral devices, and a network, respectively.

The components of system 100 may be configured in a number of ways, including the number of processor chips used, and the placement of components on processor chips. For example, crossbar 106, network interface 116, I/O interface 114, and peripheral interface 118 may optionally be on the processor chip or may be external to it. The system may be configured in a Uniform Memory Access (UMA) architecture or a Non-Uniform Memory Access (NUMA) architecture.

In one UMA configuration, L2 caches 108a-d and cores 0-7 102a-h may all be configured on a single processor chip. Memory 110a and 110b may be banks of memory external to the processor chip.

In a system with a NUMA architecture, CPUs may be configured to access all memory, but may have different access costs for at least some of the memory, where an access cost is one or more of an amount of latency, throughput, or another metric. In one NUMA configuration, L2 caches 108a-b and cores 0-3 102a-d may be configured on a first processor chip, and L2 caches 108c-d and cores 4-7 102e-h may be configured on a second processor chip. Dashed lines 132 and 134 indicate the components that may be contained in such a first processor chip and a second processor chip, respectively. Memory 110a and 110b may be memory components accessible by either processor chip. However, a CPU on the first processor chip may incur a higher cost to access memory 110b than memory 110a, and a CPU on the second processor chip may incur a higher cost to access memory 110a then memory 110b. In one configuration, a system may have a topology such that data must travel different numbers of hops between components, and a CPU may require a different number of hops to access each memory component. In a NUMA architecture, it is generally desirable for a CPU to use a memory component having the lowest latency, though it may be necessary to use a higher latency memory component if the lower latency memory component is unavailable. In one configuration, crossbar 106, network interface 116, I/O interface 114, and peripheral interface 118 are external to the processor chips. In one configuration, respective instances of crossbar 106, network interface 116, I/O interface 114, and peripheral interface 118 are integrated on each processor chip.

Cores 102a-h may be configured to execute instructions and to process data according to a particular instruction set architecture (ISA). In one embodiment, the cores 102a-h may be configured to implement the SPARC V9 ISA, although in other embodiments any desired ISA may be employed, such as x86, PowerPC, or MIPS. In one embodiment, the UltraSPARC processor core design may be employed. The processor core may be found in many forms, including the 64-bit SPARC RISC microprocessor from Sun Microsystems, or other 32-bit or 64 bit microprocessors by other manufacturers. Virtually any suitable microprocessors, microcontrollers, or microcomputers may be utilized. In the illustrated embodiment, each of cores 102a-h may be configured to operate independently of the others, such that each of the cores 102a-h, or a portion thereof, may execute in parallel.

Each of cores 102a-h may be configured to execute multiple strands concurrently, where a given strand may execute instructions independently of instructions being executed by another strand. For example, a software process or application may include one or more threads such that each thread is scheduled to execute on one of the cores 102a-h. Multiple threads of a software process or application may execute on strands in the same core, different cores, or a combination thereof. Cores 102a-h are each referred to as a multi-stranded core. As illustrated by the exploded view of core 102a, core 102a includes four hardware threads (strands), logically represented as hardware CPUs 122a-d. A strand may be considered to be a virtual central processing unit, and is referred to herein as a CPU. Typically, an operating system manages software threads, and assigns each software thread to execute on a corresponding CPU. The process of assigning software threads to a CPU is referred to as "scheduling" software threads. Though much of the description herein refers to assigning threads to CPUs, threads may also be assigned to processing units other than CPUs, such as cores or execution pipelines. Mechanisms of the invention herein described may be applied to such other processing units.

Each of the cores 102a-h may also have a set of registers (not shown) for each strand, in order to minimize the overhead of switching between strands. Though not illustrated in FIG. 1, example core 102a further may further include an instruction fetch unit (IFU) that is coupled to a memory management unit (MMU) and a load store unit (LSU). Core 102a further includes an L1 cache 104, and two integer execution units (IEU) 132, each corresponding to an execution pipeline. In the illustrated configuration, CPUs 122a-b of core 102a are coupled to IEU 132a, and therefore share an execution pipeline; CPUs 122c-d are coupled to IEU 132b and share an execution pipeline. Each of IEUs 132a-b is coupled to, and shares L1 cache 104. FIG. 1 further illustrates core 102a including or coupled with a floating point unit (FPU) 130. FPU 130 is coupled to IEUs 132a-b, and is therefore shared by both corresponding pipelines.

In various embodiments, cores 102a-h may be configured differently than the illustration of FIG. 1. For example, a core may have more or less than four strands, or more or less than two IEUs. More or less than two strands may share an IEU, and more or less than two IEUs may share an L1 cache.

In some embodiments, each processor core 102a-h shares corresponding L2 cache 108a-d to speed memory access and to reduce delays imposed by accessing remote memory subsystems. Cache memory may include one or more levels of dedicated high-speed memory holding recently accessed data, designed to speed up subsequent access to the same data. When data is read from main memory 110a-b, a copy is also saved in the L2 cache 108a-d, and an L2 tag array stores an index to the associated main memory. The L2 cache 108a-d then monitors subsequent requests for data to determine if the information needed has already been stored in the L2 cache. If the requested data is present in the L2 cache, the data is retrieved from the L2 cache and delivered to the processor core 102a-h; thus, fetching the information from main memory is not needed. If the data is not present in the L2 cache, the data is fetched from main memory and a copy of the data and its address is stored in the L2 cache 108a-d for future access.

While the present invention may be implemented on a vertical multi-stranded processor where a memory space, such as L2 cache, is shared by the strands, the invention may also be implemented with a horizontal multi-stranded processor where the memory space is not shared by the strands, or with a combination of vertical and horizontal multi-stranding.

In the illustrated embodiment, system 100 may be configured to receive data from sources other than system memory. I/O interface 114 may be configured to provide a central interface for such sources to exchange data with each of cores 102a-h or L2 cache 108 via crossbar 106. In some embodiments, I/O interface 114 may be configured to coordinate DMA transfers of data between network interface 116 or peripheral interface 118 and system memory via a memory controller. In one embodiment, I/O interface 114 may be configured to couple system 100 to external boot or service devices.

Peripheral interface 118 may be configured to coordinate data transfer between system 100 and one or more peripheral devices. Peripheral devices may include storage devices, display devices, multimedia devices, or any other suitable type of peripheral device. Any suitable interface standard or combination of standards may be employed. Examples of standards include Peripheral Component Interface Express, USB, and IEE 1394.

Network interface 116 may be configured to coordinate data transfer between system 100 and one or more devices coupled to system 100 via a network. In one embodiment, network interface 116 may be configured to perform the data processing necessary to implement an Ethernet (IEEE 802.3) networking standard such as Gigabit Ethernet or 10-Gigabit Ethernet, though any suitable networking standard may be implemented. In some embodiments, network interface 116 may be configured to implement multiple discrete network interface ports.

In the illustrated configuration, system 100 has eight cores, each core having four strands, for a total of 32 strands. It should be noted that the invention is not limited to a system with eight cores or cores with four strands. Various configurations may have more or less than eight cores, and each core may have more or less than four strands, in accordance with the invention. The invention may also be employed in a configuration having heterogeneous components. For example, one or more of cores 102a-h may operate at a different clock speed from the remaining cores. Some cores may have different configurations of components, such as FPU 130, or components with different capabilities, connections, or other differing characteristics. Processors having different configurations or characteristics may be combined in a computing system. In some configurations, the OS or other software may dynamically create heterogeneity, by configuring a higher priority to a core, blocking out a portion of cache or memory, or other such configuration settings.

As discussed above, and illustrated by the exploded view of core 102a, any one or more of cores 102a-h may be configured for multi-stranded execution. In one embodiment, each of cores 102a-h may be configured to perform fine-grained multi-stranding, in which each core may select instructions to execute from among a pool of instructions corresponding to multiple strands, such that instructions from different strands may be scheduled adjacently. For example, in a pipelined embodiment of core 102a employing fine-grained multi-stranding, instructions from different strands of the illustrated strands 122a-d may occupy adjacent pipeline stages, such that instructions from multiple strands may be in various stages of execution during a given core processing cycle.

FIG. 1 illustrates sharing of hardware components, some of which are discussed above. Generally, when a hardware component is shared by two or more other components, there may be a contention by the sharing components that may result in degradation of some metric, such as latency, bandwidth, throughput, or the like. This is referred to as destructive interference. For example, sharing of a floating point unit by two threads may degrade the performance of one of the threads if it must wait to use the FPU when the other thread is using it. In some situations, sharing of a component may result in an improvement of one or more of these metrics. This is referred to as constructive interference. This may be the case, for example, where two threads access a common block of memory and share a cache, such that a first thread may avoid a memory access because the second thread previously caused the block to be brought into the cache. Thus, one or more memory accesses can be avoided. Avoiding a memory access because the needed block is already in the cache is referred to as "cache reuse."

A relationship between threads that results in increased cache reuse with respect to a shared cache is referred to as thread affinity. Thread affinity may also refer to a relationship with respect to another component, wherein the use of the component is enhanced due to a shared use. On the other hand, two threads may have a contention for a cache when they do not have affinity and cache contents associated with one thread must be discarded to make room for the other thread, or where access to the cache is delayed by concurrent accesses. As used herein, two threads are said to have an affinity with respect to a component if sharing the component may provide an advantage to at least one of the threads. A thread may also be said to have an affinity with a CPU if the thread has an affinity with a thread concurrently executing or recently executed on the CPU. This also includes the situation in which the thread itself recently executed on the CPU, so the thread has an affinity with itself in a previous execution cycle.

Generally, affinity is a symmetric relationship, so that if a first thread has an affinity with a second thread or component, the second thread or component has an affinity with the first thread. It is to be noted that, as used herein, affinity is a probabilistic relationship. That is, two threads may be said to have an affinity with each other because they execute the same code and access the same memory blocks, yet during a specific time period, they might access only different memory and so have not benefit from sharing a cache. Also, two threads may have an affinity with each other with respect to a first component, while having a contention with each other with respect to a second component. The components may be different levels of cache, a cache and an FPU, or another combination of components.

Some examples of affinity or contention illustrated in the configuration of FIG. 1 are now described. There is potential contention on IEU 132a and its corresponding pipeline, FPU 130, L1 cache 104, L2 cache 108, memory 110, or the various shared connections to these components. There is also a potential affinity on L1 cache 104, L2 cache 108, and memory 110. The use of contentions and affinities is further discussed below.

As discussed above, system 100 includes a number of hardware sharing relationships between components, and in particular, performance relevant hardware sharing relationships. A group of CPUs, together with the performance relevant hardware sharing relationships, is referred to as a processor group (PG).

Figure 2:
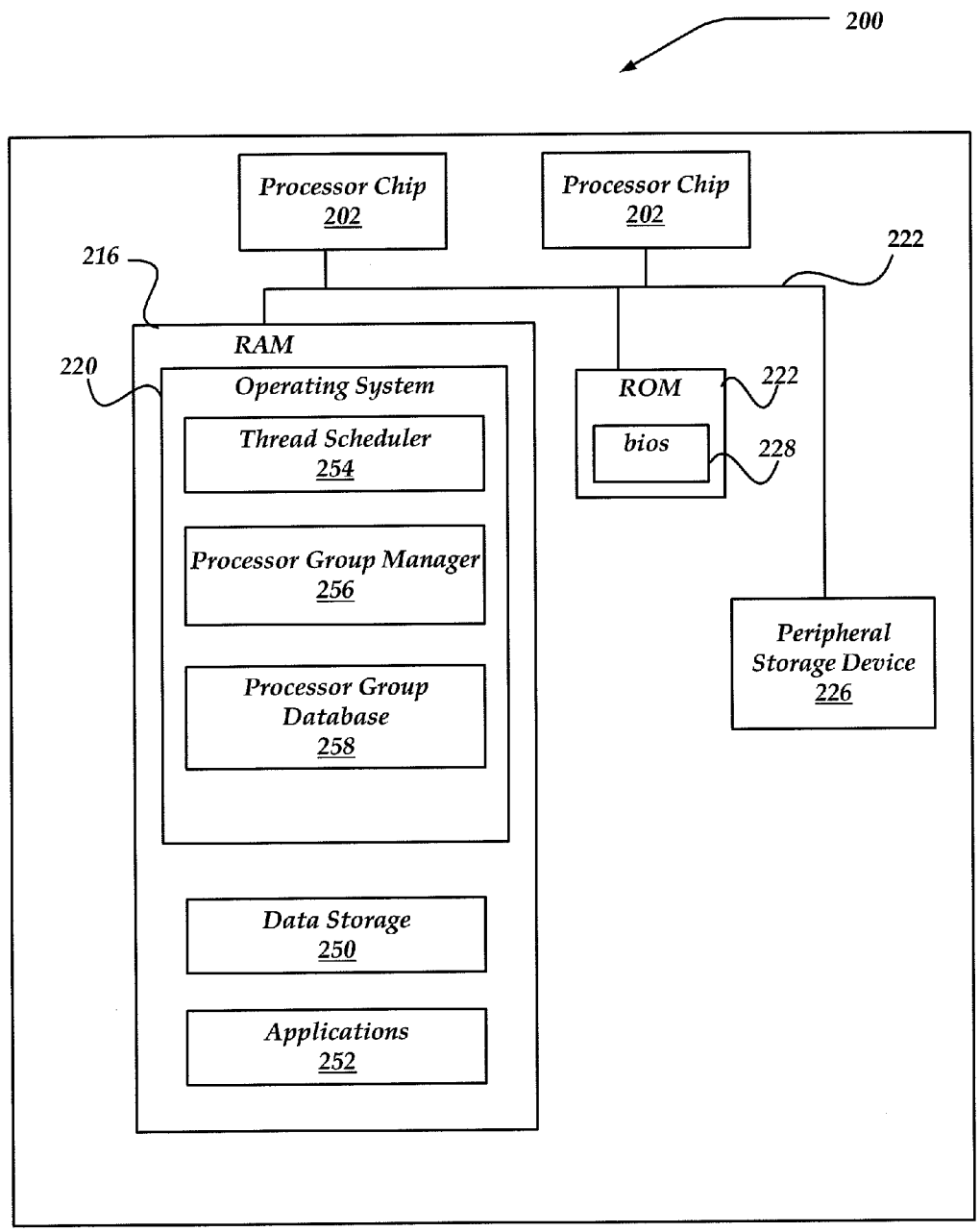
FIG. 2 is a block diagram generally showing one embodiment of a system including two multiple core, multi-stranded processors.

One embodiment of a system including system 100 is illustrated in FIG. 2. System 200 may include more or less components than those shown. The components shown, however, are sufficient to disclose an illustrative embodiment for practicing the invention. In the illustrated embodiment, system 200 may be a computing device that includes two instances of processor chip 202. Various embodiments of system 200 may include one or more processor chips 202. Processor chips 202 may employ NUMA or UMA architectures in configurations such as those described above, or other configurations. Embodiments of system 200 include mainframe computers, servers, personal computers, handheld computers, PDAs, cell phones, and other devices that include one or more processors.

System 200 includes processor chips 202, system memory, and one or more peripheral storage devices 226 all in communication with each other via bus 222. The system memory, in various embodiments, may include RAM 216, ROM 222, and one or more permanent mass storage devices, such as a hard disk drive, tape drive, optical drive, disk arrays, or floppy disk drive. System 200 may communicate with the Internet, or another communications network, using various communication protocols including IP, TCP/IP, UDP, HTTP, WAP, or other protocols.

The system memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The system memory stores operating system 220 for controlling the operation of system 200 and processor chips 100. Any operating system, including a general-purpose operating system or a special-purpose operating system, may be employed. Basic input/output system ("BIOS") 228 is also provided for controlling the low-level operation of system 200.

Operating system 220 may include a thread scheduler 254, a processor group manager 256, and a processor group database 258. Thread scheduler 254 may include instructions and logic that assign threads to corresponding CPUs, and schedules threads to execute on their corresponding CPUs. Processor group manager 256 may include instructions and logic that manages relationships between components, and creates and manipulates processor groups. Processor group database 258 may maintain data describing component characteristics and relationships for use by processor group manager 256. Operations performed by each of these components in accordance with the present invention are discussed in further detail herein.

Though each of the operating system components illustrated in FIG. 2 are shown as separate components, and operations may be described herein as associated with or performed by a component, the invention is not so limited. Instructions or actions of each component may be combined or distributed in a variety of ways, in various configurations, among each other or additional components. In one configuration, each component includes respective modules of software instructions; however each component may be thought of as a logical component that may be implemented in a variety of configurations. In some configurations, at least a part of the logic of any component may be implemented in a hardware component that may reside on processor chip 202 or another part of system 200.

The system memory also includes one or more data storage components 250, which may include data used by the operating system 220 or application programs. Data may be stored in RAM 216 or other storage devices, such as a hard disk drive. One or more applications 252 and application components may be loaded into system memory and executed on operating system 220. Examples of application programs may include search programs, schedulers, calendars, database programs, word processing programs, HTTP programs, customizable user interface programs, IPSec applications, encryption programs, security programs, VPN programs, SMS message servers, IM message servers, email servers, web servers, account management and so forth.

Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 3:
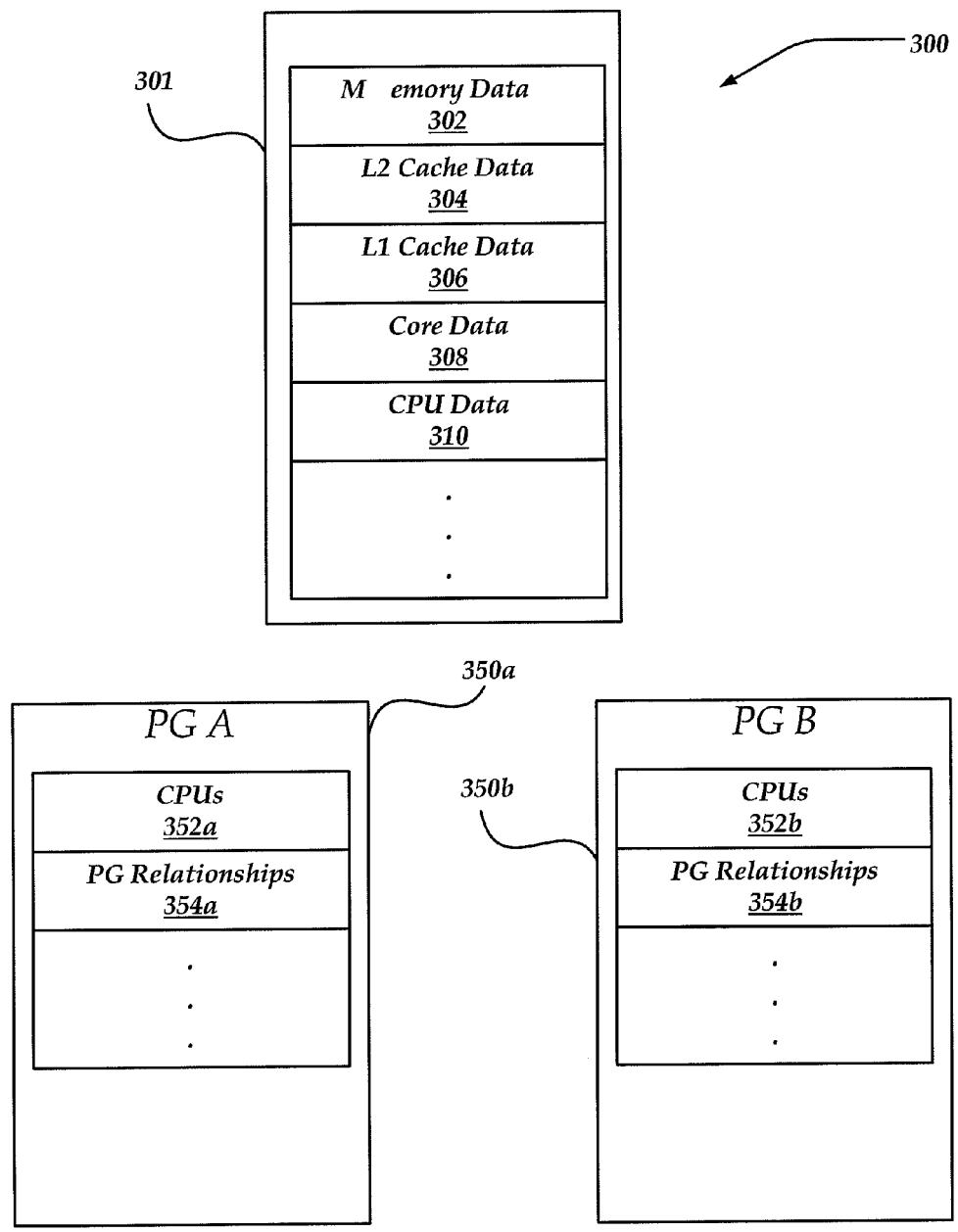
FIG. 3 is a block diagram generally showing a database in accordance with an embodiment of the invention.

One aspect of the invention includes maintaining data describing characteristics of processor chip components. FIG. 3 shows a logical view of a processor database 300, in accordance with an embodiment of the invention. Processor database 300 may include a section of component data 301. Component data 301 may include, for each of various components, data describing characteristics of the component and relationships with other components. Memory data 302 may include, for each memory component, characteristics such as capacity, read/write latency, transfer speeds, or the like. It may also include, for each memory component, a corresponding set of L2 cache components configured to cache data from the memory component, or relationships to "sibling" memory components. In a NUMA architecture, memory data 302 may include access cost differences for relevant components.

L2 cache data 304 may include for each L2 cache component, characteristics or relationships, such as described above for memory data 302, as well as relationships with corresponding memory components, sibling L2 cache, or other data. L1 cache data 306 may include similar characteristic data for each L1 cache. Core data 308 may include data describing characteristics or relationships corresponding to each core 0-7. CPU data 310 may include data describing characteristics of each CPU and relationships with other processor components. This may include hardware sharing relationships, such as sibling CPUs sharing a pipeline, cache, or other component.

FIG. 3 also illustrates processor group data 350*a*, which contains data specific to a processor group. Processor group data 350*a* may contain or reference a subset of the data from database component data 301, as well as additional information describing the processor group. For example, the processor group corresponding to processor group data 350*a* may include a subset of the CPUs contained in the processor chip, as well as a subset of other components. CPU section 352*a* may describe the set of CPUs that reside in the corresponding processor group, as well as a set of CPU characteristics that are common to all CPUs of the set. Processor group data 350*a* may further include performance relevant hardware sharing relationships between the CPUs. Though not illustrated, another section may describe a subset of the CPUs from section 352*a*, where the subset has one or more characteristics that differ from the complete set of CPUs in section 352*a*. Thus, a class hierarchy may exist such that a subclass of components inherits characteristics from a parent class. PG relationship section 354*a* may describe relationships of the processor group with other processor groups. In one embodiment, processor groups may be nested, such that one processor group contains another processor group. This information may be reflected in section 354*a*. Processor group data 350*a* may include additional data not illustrated in FIG. 3, such as membership, characteristics and relationships of pipelines, caches, memory, and other hardware components.

FIG. 3 illustrates processor group data 350*b*, containing data corresponding to another processor group. Processor group data 350*a* and 350*b* may have data in common, including data that is a subset of the data from component data 301. Each may differ in their defining characteristics, and have different relationships from each other. Thus, processor group data 350*b* may include a CPU section 350*b* that is the same or different from CPU section 350*a*, as well as a PG relationship section 354*b* that is the same or different from PG relationship section 354*a*. Any number of processor groups may be used, each having its own respective processor group data.

In one embodiment, a processor chip may have an API that enables the operating system to query and retrieve characteristic data such as described herein. During booting, the operating system may perform one or more queries to retrieve this data. For example, a processor chip may provide an interface to enable the OS to query for the set of CPUs that share a pipeline, an L1 cache, an L2 cache, or the like. In one embodiment, the process of querying the processor chip may have optimizations that enable the OS to avoid querying some permutations of components.

Figure 4:
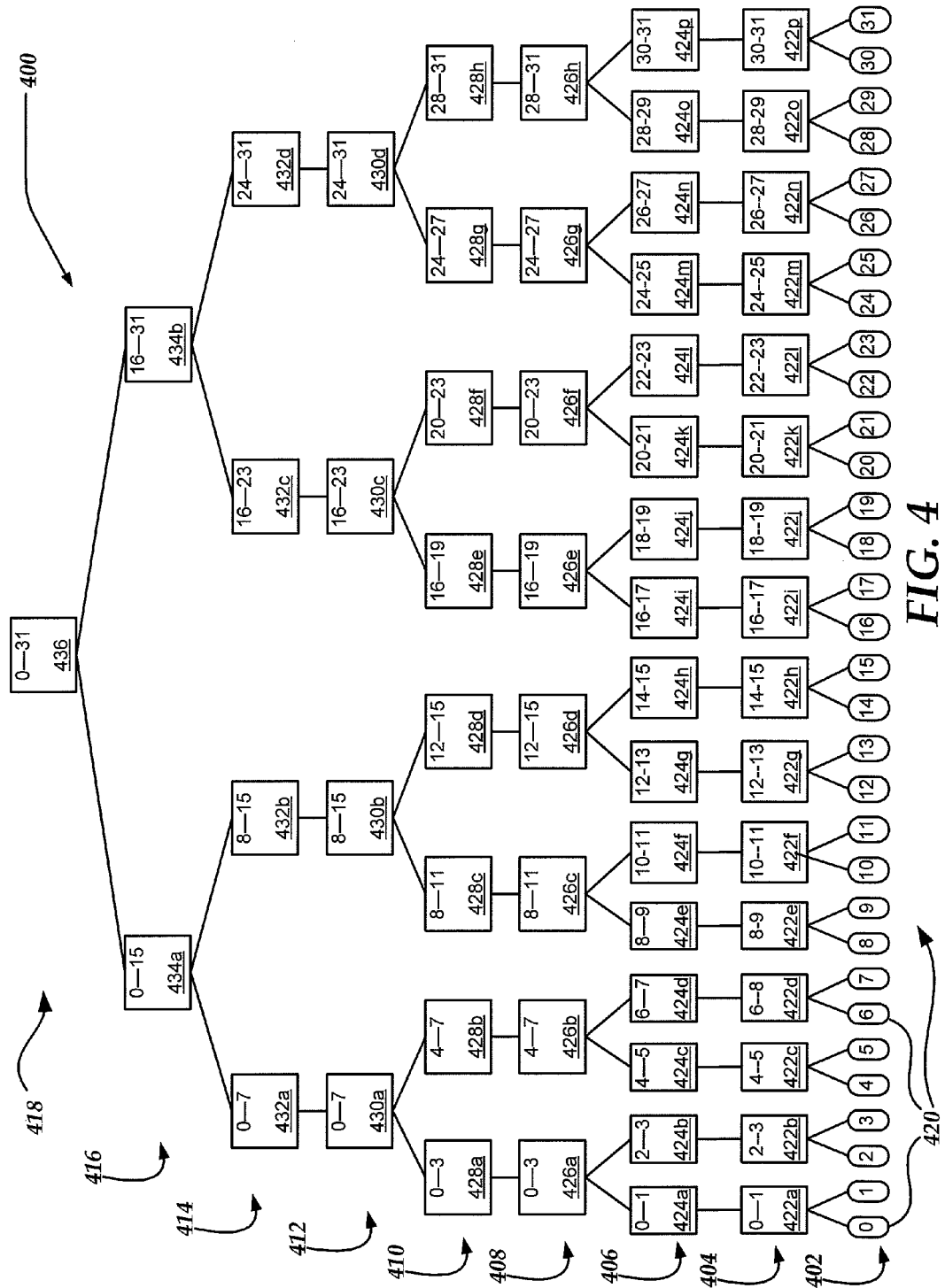
FIG. 4 is a diagram generally showing a processor group hierarchical structure in accordance with an embodiment of the invention.

Mechanisms of the invention may include using various configuration and characteristic data, such as described above, to create a hierarchical data structure. In one embodiment, a directed acyclic graph may be created. A hierarchical data structure may be represented in a number of ways. In one embodiment, the PG database and the PG hierarchy are integrated in a single data structure. In other embodiments, the PG database and the PG hierarchy may be represented in multiple data structures. FIG. 4 illustrates an example of a processor group hierarchy 400 that may correspond to a processor group. The PG hierarchy 400 forms a multi-level directed acyclic graph, in which the CPUs are at the lowest level. Though the PG hierarchy 400 forms a tree structure, in some embodiments, the hierarchy may be other than a tree structure.

In the discussion that follows, references are made to components of FIG. 1, to show the relationship of the PG hierarchy 400 to system 100. In the illustrated PG hierarchy 400, the lowest level is the CPU level 402. For purposes of this discussion, the lowest level is referred to as the "first" level, and the levels are numbered as they ascend the hierarchy. Thus, the second level is the execution pipeline level 404. The CPU level 402 corresponds to CPUs 122*a-d* and other CPUs not illustrated in FIG. 1. Each of the nodes 420-0 to 420-31 at the CPU level corresponds to an instance of a CPU, such as CPUs 122*a-d*. The execution pipeline level 404 corresponds to execution pipelines, and each node 422*a-p* at this level corresponds to an execution pipeline, such as those represented by IEUs 132*a-b*. The third level is the "pipe to L1 cache" level 406, in which each node 424*a-p* corresponds to a connection from an execution pipeline to an L1 cache, such as connection 124.

The fourth level of the PG hierarchy 400 is the L1 cache level 408, in which each node 426*a-h* corresponds to an L1 cache, such as L1 caches 104. The fifth level is the pipe to L2 cache level 410, in which each node 428*a-h* corresponds to a connection to an L2 cache, such as connection 126. The sixth level is the L2 cache level 412, in which each node 430*a-d* corresponds to an instance of an L2 cache, such as L2 caches 108*a-d*. The seventh level is the pipe to memory level 414, in which each node 432*a-d* corresponds to a connection from an L2 cache to a memory component, such as connection 128. The eighth level is the memory level 416, in which each node 434*a-b* corresponds to an instance of a memory component 110*a-b*. The ninth, and top level, is the interconnect 418, in which the single node 436 corresponds to interconnect 112.

Thus, the PG hierarchy 400 represents a processor group that contains all of the CPUs of FIG. 1, and corresponding components. As shown in FIG. 4, PG hierarchy 400 represents the performance relevant hardware sharing relationships between each of the CPUs of FIG. 1. In the discussion that follows, individual CPU nodes 420 of FIG. 4 are referenced as CPU node 420 followed by the CPU number. Thus, CPU node 0 is referred to as CPU node 420-0, CPU node 1 is CPU node 420-1, and so forth. Each CPU node 420-0 to 420-31 corresponds to a respective CPU of system 100, in FIG. 1 (though not all CPUs are explicitly illustrated in FIG. 1). CPU nodes 420-0 to 420-31 are referred to herein as CPU 420-0 to 420-31, respectively. Each node of the hierarchy corresponds to a group of one or more CPUs 420-0 to 420-31. Each node also corresponds to a level of the hierarchy 400 and corresponds to a component or set of components of the system 100, or an abstraction representing a subset of components. As discussed herein, other processor groups associated with system 100 or other processors may contain a subset of the components on a processor chip, or components of more than one processor chip, and a corresponding hierarchy may include more or less levels than those illustrated in hierarchy 400.

As can be seen from the processor group hierarchy 400 and the system 100, the lowest level of the hierarchy (the CPU level 402) represents the most hardware sharing between CPUs, and the highest level (interconnect level 418) represents the least hardware sharing, and hardware sharing remains the same or decreases as one ascends the hierarchy. For example, referring to the node 422a of the execution pipeline level 404 (second level) that corresponds to CPUs 0 and 1, CPUs 0 and 1 share an execution pipeline, a pipe to L1 cache, an L1 cache, a pipe to L2 cache, an L2 cache, a pipe to memory, a memory component, and an interconnect. At the L1 cache level 408, the node 426a corresponding to CPUs 0-3 shares an L1 cache, a pipe to L2 cache, an L2 cache, a pipe to memory, a memory component, and an interconnect, but the CPUs do not all share an execution pipeline or pipe to L1 cache. At the memory level 416, in which the node 434a corresponds to CPUs 0-15, all of the CPUs 0-15 share memory and an interconnect, but not L2 cache or components at the lower levels.

Processor group hierarchy 400 also illustrates that pairs of "adjacent" CPUs may differ in the amount of sharing. For example, CPU 0 and 1 share more components than CPUs 3 and 4. Thus, a processor group and associated hierarchy facilitate awareness of performance relevant hardware sharing relationships by the operating system or applications to optimize for multi-stranded operation. Specifically, a PG hierarchy shows hardware sharing relationships between CPUs, and facilitates determining an amount of sharing, and specific components that are shared, between two or more CPUs. As discussed below, a processor group hierarchy facilitates optimizing scheduling threads for affinity and for load balancing threads on a processor chip.

The processor group hierarchy 400 represents a processor group having 32 CPUs. FIG. 4 may also be used to indicate processor groups, and corresponding hierarchies, that are a subset of this processor group. A PG hierarchy having a root at node 434a, including descendent components of node 434a, corresponds to a processor group made up of CPUs 0-15. A PG hierarchy may be referred to by the identity of its highest-level node, though a single node may have more than one PG hierarchy that descends from it. Thus, this PG hierarchy is referred to as PG hierarchy 434a. A PG hierarchy having a root at node 432a, including descendent components of node 432a, corresponds to a processor group made up of CPUs 0-7. It may be noted that the PG hierarchy 432a and the PG hierarchy 430a both include an identical group of CPUs 0-7. As used herein, the term "processor group" refers to a collection of one or more processing units and an associated graph structure.

Figure 5:
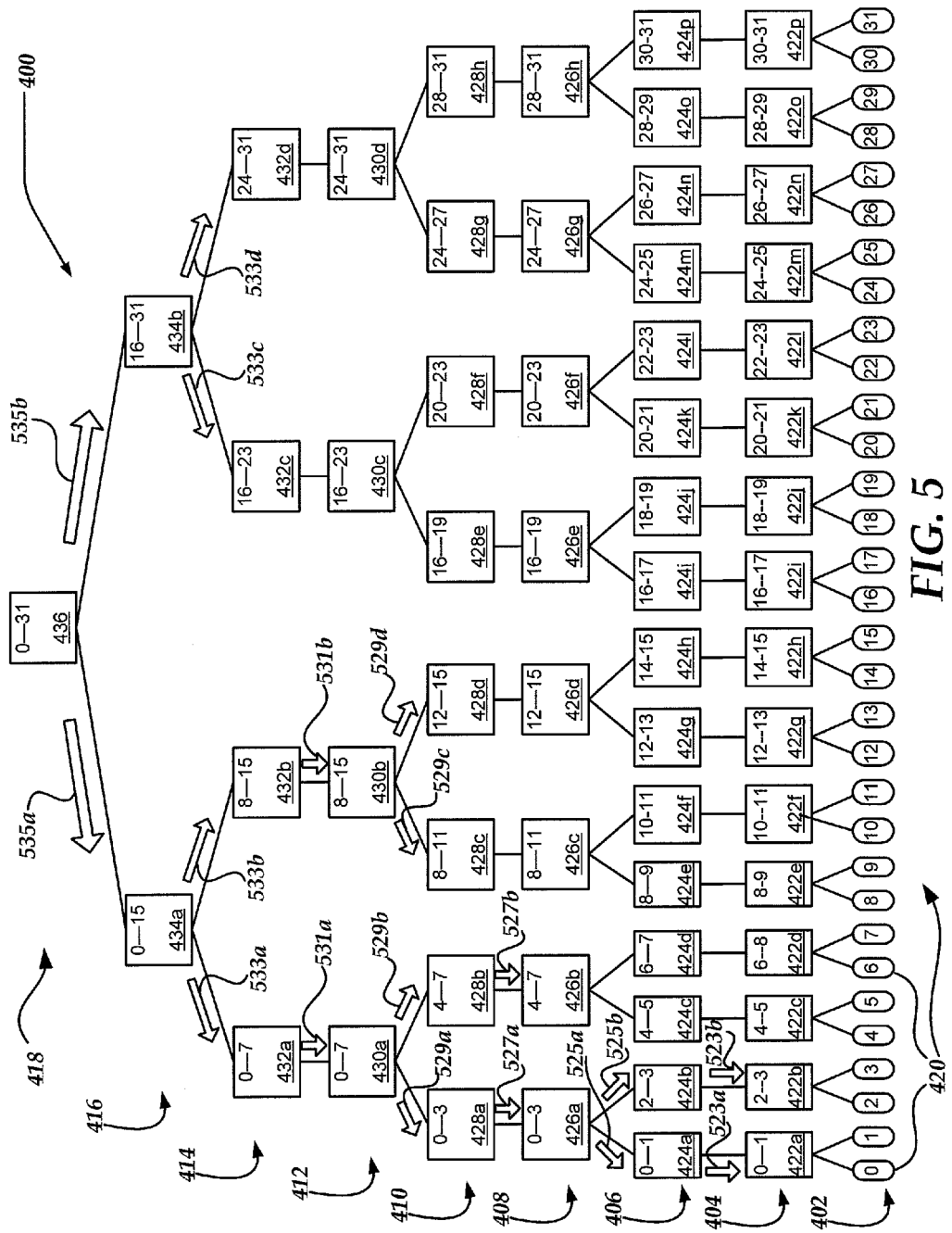
FIG. 5 is a diagram generally showing a processor group hierarchical structure as it may be used for load balancing in accordance with an embodiment of the invention.

FIG. 5 illustrates a technique for performing a load balancing process across a processor group containing 32 CPUs. As discussed herein, the technique employs the PG hierarchy 400 of FIG. 4, though it may be used with other PG hierarchies. FIG. 5 shows the PG hierarchy 400. Elements of FIG. 5 that are like numbered to those of FIG. 4 have similar characteristics, and the discussion of these elements of FIG. 4 may apply to FIG. 5, unless stated otherwise herein.

Numbered arrows 535, 533, 531, 529, 527, 525, and 523 represent operations that are performed during a load balancing process. They also represent paths along the PG hierarchy 400 that may be followed during a traversal of the PG hierarchy 400, and specifically as part of a load balancing process. In one embodiment, a load balancing process begins at the node representing the least amount of component sharing. In FIG. 5, this is the root node 436. The set of one or more threads to be balanced may be divided between the two PG hierarchies that descend from this node, in particular, along arrows 535a and 535b to PG hierarchies 434a and 434b, respectively. In FIG. 5, there is an implicit arrow corresponding to each path between nodes. However, for simplicity not all arrows are explicitly illustrated, though they may be referenced herein.

The set of threads to be balanced may include threads that are currently active on a CPU. This may include threads that are executing on an instruction pipeline or executing on a CPU but are blocked. A thread may be blocked while waiting for a time slot on an instruction pipeline, while waiting for a memory access or I/O, or for another reason. It may also include threads that are inactive, such as those that are on a queue associated with a CPU, or threads that are not yet assigned to a CPU or a queue. In one configuration, a set may include a combination of active and inactive threads. In one configuration, a set may include only active threads or only inactive threads.

Balancing threads across two or more subgroups may be performed in a number of ways, and may consider one or more factors. Factors may include requirements of each thread, such as amount of CPU time required, amount of a hardware resource such as an FPU required, associated priority, bandwidth, or the like. Factors may also include current load or available capacity of each subgroup. Load or available capacity may be measured by various metrics, such as number of current threads, CPU time used by each thread, amount of a hardware resource, such as an FPU, used in use or available for use, priorities of current threads, available bandwidth, capacities of CPUs or associated components in each subgroup, or the like. Metrics may be maintained corresponding to each node, or a subset thereof, or for individual CPUs. An aggregate or average load, as well as a minimum CPU load may be maintained corresponding to a node and its corresponding components. One load balancing mechanism may randomly assign threads to each subgroup proportional to the number of available CPUs. Various load balancing considerations are known in the art and are not discussed in detail herein. Virtually any load balancing processes or combinations thereof may be employed at each step of the process.

After dividing threads among the sub PG hierarchies 434a and 434b, a process may proceed recursively to a next level down and divide each group of threads further into subgroups that descend from each of these nodes, in particular, along arrows 533a and 533b from node 434a, and arrows 533c and 533d from node 434b. The subgroups below each of nodes 432a-d are nodes 430a-d, respectively, along respective arrows 531a-d. Since there is only one path from each of nodes 432a-d, division is not required at this level.

The process continues, recursively dividing from each of nodes 430a-d along respective pairs of arrows 529a-b, 529c-d, 529e-f, and 529g-h, to nodes 428a-h. From each of nodes 428a-h, the process continues along respective arrows 527a-h to respective nodes 426*a-h* without division. From each of nodes 426*a-h*, the process may continue by dividing along arrows 525*a-p* to nodes 424*a-p*, and proceeding along arrows 523*a-p* to nodes 422*a-p* without division. Finally, threads may be divided between each of the two CPUs corresponding to each node 422*a-p*. For example, from node 422*a*, threads may be assigned to CPU 420-0 or 420-1.

It is to be noted that the term "dividing" along arrows, paths, or across sub-groups does not suggest that threads are evenly divided among the possible choices at each level, nor does it suggest that there is at least one thread along each possible choice, though these are possible. The threads may be divided in any possible combination, including having all of the threads assigned to a single choice. In one configuration, there may be a single thread that is being processed, and "dividing" the single thread refers to selecting one of the possible choices.

In one embodiment, the process may continue even after a point is reached in which only one thread is left in a set of threads. This allows the thread to be scheduled on a CPU in a load-balanced manner considering current loads. Thus, the entire process described above may even begin with a single thread to be scheduled.

It is to be noted that in various implementations, the ordering of steps of the procedure may vary, with respect to differing paths down the hierarchy. For example, after balancing a set across PG hierarchies 434*a* and 434*b*, recursive balancing across each sub-group may occur concurrently or sequentially with respect to the other sub-group. Similarly, at each level, the process of dividing sets among peer processor groups may be performed in various sequences.

One outcome of the above process is that threads are balanced across the available CPUs of the processor group, within the constraints of the load balancing heuristics employed. Another outcome is that in a configuration where the number of threads to be balanced is less than the number of CPUs, threads are scheduled on CPUs such that a minimum of contention occurs. By beginning at a node representing the least amount of sharing, threads are distributed across subgroups to avoid contention. For example, performing the process with two threads results in a configuration in which one of the threads is scheduled on one of CPUs 0-15 and the second thread is scheduled on one of CPUs 16-31, each processor group having the least amount of contention of components with the other. Similarly, for greater numbers of threads, each will be scheduled to have the least amount of contention with the others. It is to be noted that other factors may be considered that are contrary to a goal of minimizing contention, so that actual results are not necessarily optimal with respect to load balancing.

Figure 6:
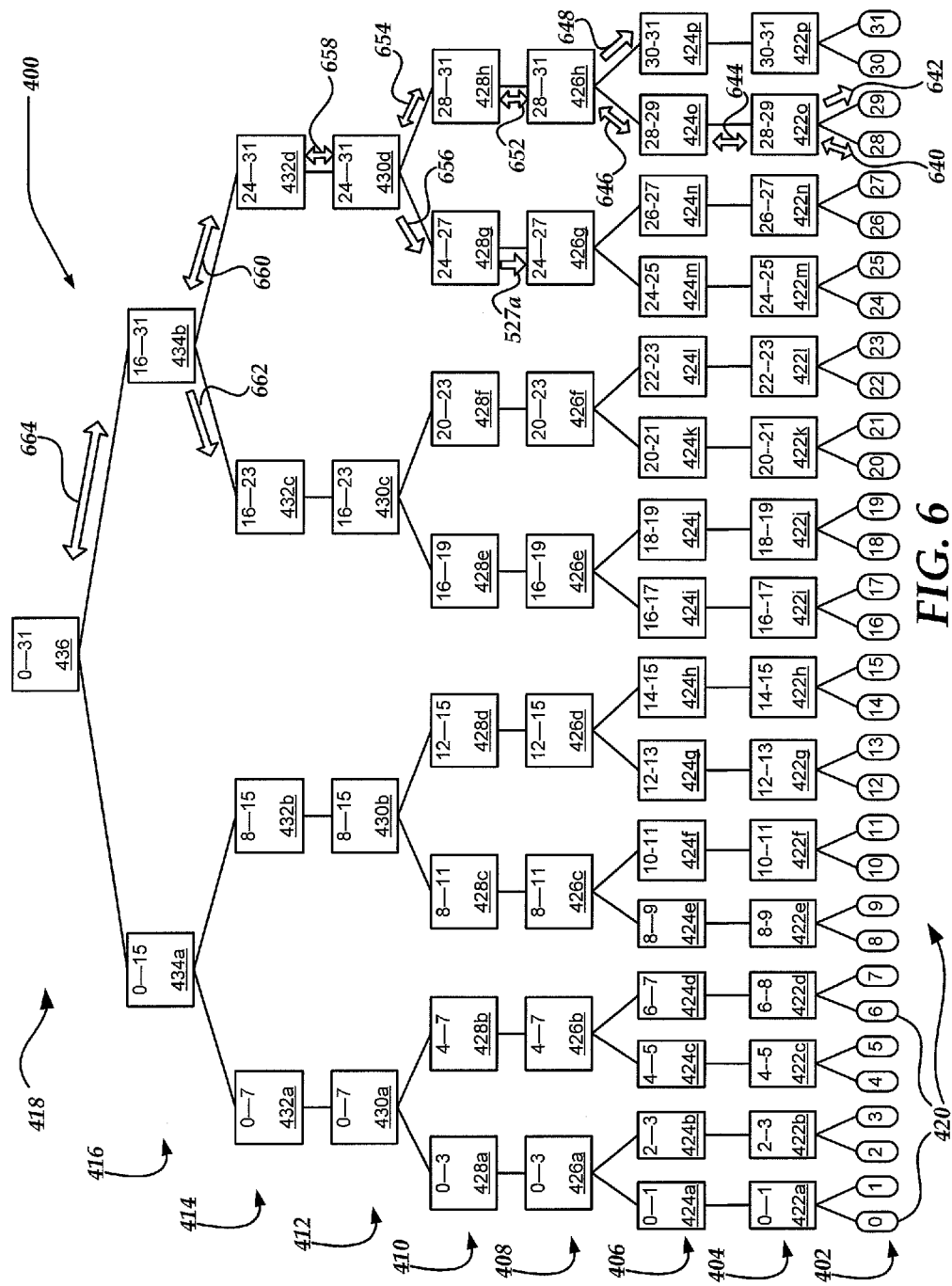
FIG. 6 is a diagram generally showing a processor group hierarchical structure as it may be used for component sharing in accordance with an embodiment of the invention.

FIG. 6 illustrates a technique for scheduling one or more threads in a processor group containing 32 CPUs, by employing the PG hierarchy 400 of FIG. 4. In this technique, thread affinity may be a consideration, such that maximizing, or at least increasing, sharing components is a beneficial outcome. As discussed herein, sharing of a cache may result in increased cache reuse, providing a performance benefit to one or more threads. Similarly, sharing of other components may provide beneficial results in performance or other metrics. A cache or other component may be beneficially shared by two different threads or by a single thread in different time slots. FIG. 6 shows the PG hierarchy 400. Elements of FIG. 6 that are like numbered to those of FIG. 4 have similar characteristics, and the discussion of these elements of FIG. 4 may apply to FIG. 6, unless stated otherwise herein.

Numbered arrows 640-664 represent paths along the PG hierarchy 400 that may be followed during a scheduling process in which hardware sharing and affinity are factors that are considered. Each of the arrows 640-664, or combinations thereof, may be part of a traversal of the PG hierarchy 400. An example of a situation in which the technique may be applied occurs when a thread that has executed on one of the CPUs needs to be rescheduled on one of the CPUs. The thread, in its second execution time slice may have an affinity with its own execution from the previous time slice execution, with respect to one or more components, such as L1 cache 104, L2 cache 108, memory 110, or another hardware component. Therefore, it may be desirable to schedule the thread on a CPU to take advantage of, or maximize, sharing with respect to one or more of these components. Another example may include a second thread that has an affinity with a first thread that has recently executed on a CPU or is concurrently executing on a CPU. It may be desirable to schedule the second thread on a CPU to take advantage of, or maximize, sharing of the one or more components with the first thread when they have an affinity for each other (e.g. access the same data). As used herein, the term sharing refers to a shared use of a component during the same or different time intervals.

In the following discussion, a thread that has recently executed on CPU 28 is considered. The process of scheduling process may begin by examining nodes of the PG hierarchy 400 beginning at the lowest level, and in particular, the recently used CPU 28. Beginning at the CPU and moving to higher levels in the hierarchy, the process may consider whether there are any components corresponding to the nodes that are unavailable, or for which a balancing away is desirable. For example, CPU 28 may be unavailable because one or more threads of equal or higher priority are executing or waiting to execute there, the thread requires a hardware resource that is unavailable from CPU 28, there exists a high amount of contention for a shared component, or another reason. In one embodiment, one or more factors may be considered and weighted when determining whether components or CPUs corresponding to a node are available or desirable. These factors may include information represented in the PG hierarchy and associated PG database, or factors related to characteristics of the thread to be assigned. For example, a thread having a high amount of memory access may face more contention for a cache than a thread having a high amount of computation. A thread having a high amount of computation may have a higher amount of contention for an execution pipeline, an FPU, or other components, and a lower amount of contention for a cache. The process proceeds, following arrow 640 to the execution pipeline level 404 and node 422*o*.

At node 422*o*, the process may make a determination whether to descend the PG hierarchy 400, along arrow 642, to CPU 29. In the PG hierarchy 400 illustrated in FIG. 6, CPU 28 and CPU 29 have a high amount of sharing. As illustrated in FIG. 1, CPUs 28 and 29 belong to the same Core 7 102*h*, and share an IEU 132, a connection to L1 cache 104, L1 cache 104, L2 cache 108*d*, and memory 110*b*. Therefore, in one implementation, it is desirable to follow arrow 642 and schedule the thread on CPU 29. If, however, CPU 29 is unavailable or undesirable for other reasons, the process may determine, instead, to follow arrow 644 upward to node 424*o*. From this node, the process follows arrow 646 to node 426*h*.

At node 426*h*, the process makes a determination whether to proceed downward, along arrow 648, or upward, along arrow 652. Proceeding downward would indicate that the process continues proceeding downward to one of CPU 30 420-30 or CPU 31 420-31. As discussed in reference to CPU 29, a decision whether to schedule the thread on CPU 30 or CPU 31 may be made on the availability or desirability of these CPUs, which may include one or more factors.

If the process does not schedule the thread on CPU 30 or 31, it may follow arrow 652 up to node 428h and then along arrow 654 to node 430d. As can be seen from FIG. 6 and FIG. 1, node 426h represents an L1 cache 104. Scheduling the thread on one of CPUs 28-31 would result in use of the same L1 cache. Proceeding along arrow 652 indicates that the thread may be scheduled on a different L1 cache, thereby foregoing the sharing with respect to the L1 cache. Node 430d represents L2 cache 108d, and scheduling the thread on any CPU that descends from node 430d results in sharing of the L2 cache 108d.

The process may then determine whether to proceed along arrow 656, and ultimately to one of CPUs 24-27 (420-24 to 420-27). This portion of the process employs logic similar to that described above. If the determination is made to not proceed along arrow 656, the process may flow upward along arrow 658 to node 432d and arrow 660 to node 434b. Similar to the description above, the process may determine whether to descend along arrow 662 to one of CPUs 16-23 (420-16 to 420-23) or to ascend along arrow 664 to root node 436. At root node 436, the process may have exhausted all potential CPUs that have any sharing relationship with the original affinity CPU 28. At root node 436, the process may randomly select a CPU, or use another method, such as descending the PG hierarchy 400 until one of CPUs 0-31 (420-0 to 420-31) is determined. In one embodiment, descending from the root node 436 or any other node may employ at least some of the load balancing techniques discussed herein.

In FIG. 6, arrows 640, 644, 646, 652, 654, 658, 660, and 664 are bi-directional arrows. In some configurations, a scheduling process may ascend along an arrow/path and subsequently descend along the same arrow/path. A change in direction may occur at any node. It may occur, for example, if it is determined that the various factors disfavor ascending further up the hierarchy, and also that the original branch is more desirable, or at least as desirable, as a peer branch.

Though the PG hierarchy 400 illustrated in FIG. 6 is a tree structure and represents sharing relationships, variations of PG hierarchies may be employed. In some configurations, the hierarchy may be a directed acyclic graph that is not a tree. In one embodiment, a PG hierarchy may correspond to a NUMA architecture. Relationships in a PG hierarchy corresponding to a NUMA architecture may represent costs, such as latency, bandwidth, or other costs. This data may be used by the process when determining a traversal path. Depending on the configuration, and the various factors considered, a process might ascend a number of levels and then descend back down to the original affinity CPU.

It is to be noted that, in the process described with respect to FIG. 6, a determination may be made to schedule a thread to be in a queue to execute on a CPU, rather than locate another CPU. However, it may be desirable to have a thread execute immediately on another CPU, even if sharing is lost, rather than wait to execute. In various implementations, this desirability may have different weights.

In one embodiment, a thread scheduler may schedule one or more threads based on affinity and one or more other threads based on load balancing. In some embodiments, the processes of load balancing and affinity scheduling may be combined when scheduling one or more threads. For example, two threads may have a constructive sharing when sharing an L2 cache, but a destructive sharing when sharing an L1 cache. It may therefore be desirable, when scheduling one of the threads, to ascend the hierarchy to a level such that an L1 cache is not shared, while remaining at or below a level such that an L2 cache is shared.

It is to be noted that, in various embodiments, other components may correspond to nodes on a PG hierarchy, and load balancing, component sharing, or a combination thereof may be desirable with respect to these components. For example, an FPU may be represented as a node, and may indicate load balancing or sharing. A translation lookaside buffer (TLB) is a cache of virtual address to physical memory translations. Sharing of a TLB may be desirable or may warrant load balancing in some configurations. Additional or alternative memory components, such as flash memory, may also be included in a PG hierarchy.

In one embodiment, dynamic hardware characteristics associated with a CPU or other components of the processor may be retrieved in conjunction with process 500 or 600. Dynamic characteristics may include a current load, available bandwidth, cache retrievals, or the like. Any one or more of these characteristics may be used in the processes described herein related to load balancing and scheduling of threads.

Figure 7:
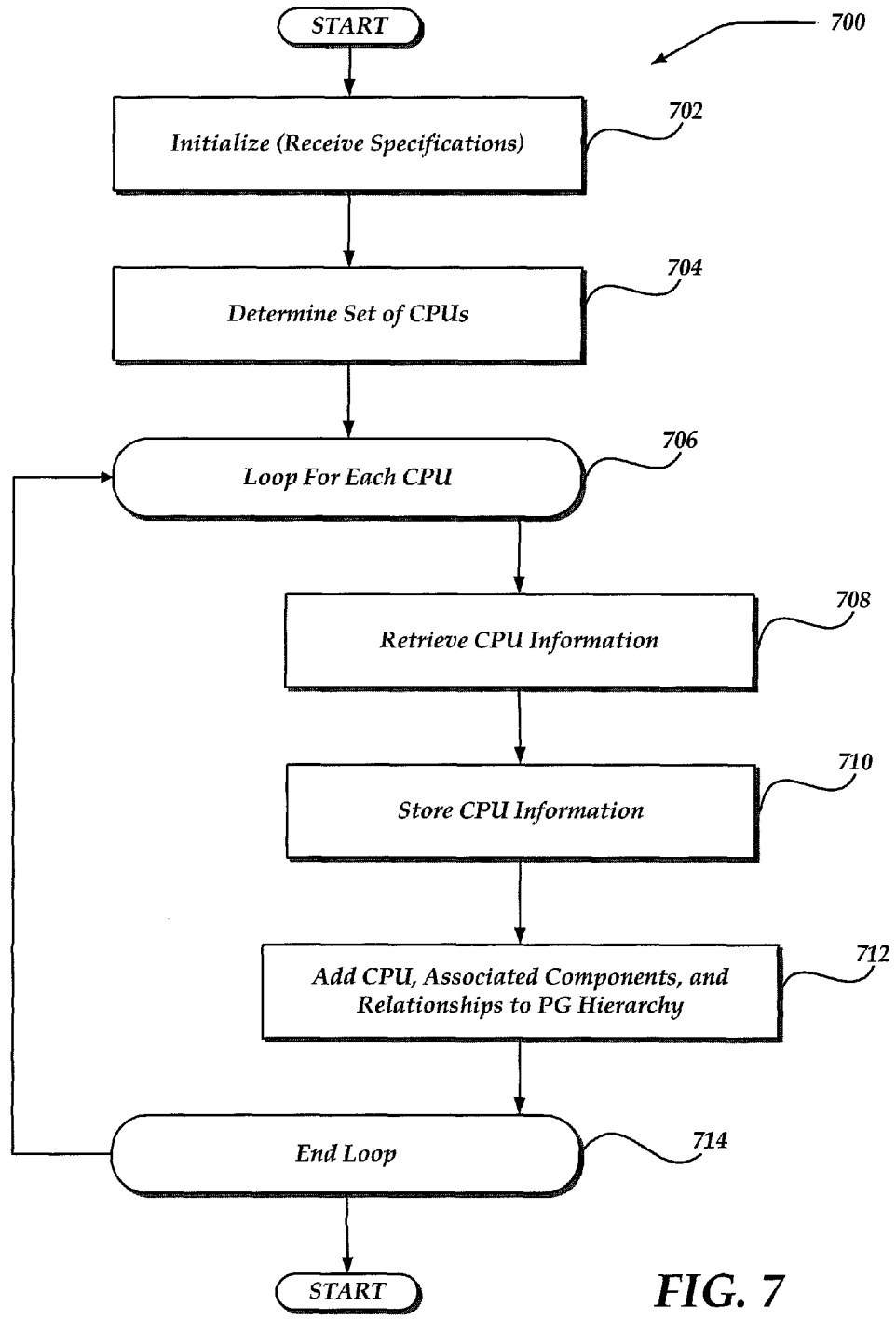
FIG. 7 is a logical flow diagram generally showing one embodiment of a method for creating a processor group hierarchy.

FIG. 7 is a logical flow diagram generally showing one embodiment of a process 700 for creating a processor group hierarchy. PG hierarchy 400 of FIG. 4 is one example of a PG hierarchy that may be created by process 700 or a portion thereof. Many other PG hierarchies may also be created. Process 700 may begin, after a start block, at block 702, where initialization is performed. Actions of block 702 may include receiving specified administrative preferences or specifications of one or more characteristics to use as a defining characteristic for the hierarchy. In the example PG hierarchy 400, hardware component sharing is used as a defining characteristic for the hierarchy, and the hierarchy represents components that are shared by each CPU. In other examples, latencies, bandwidth, or clock speed may be used as a defining characteristic, and components may be ordered based on either of these characteristics, or a combination thereof.

The process may flow to block 704, where a set of CPUs to be included in the PG hierarchy is determined. This may include retrieving a specified set of CPUs, such as a processor set. This action may include querying the processor hardware, firmware, or processor specific software for a list of CPUs, determining a subset of CPUs that meet specified criteria, or the like.

The process may flow to block 706, where a loop begins that is iterated for each CPU to be included in the PG hierarchy. The loop includes block 708, where information associated with the CPU is retrieved. This information may include various characteristics, such as clock speed, associated hardware components, relationships with other CPUs, or the like. In one embodiment, retrieving at least some of this information may include querying the processor hardware for the information. In one embodiment, these actions may include retrieving some of the information from data storage. In one implementation, relationships between CPUs may allow information associated with one or more CPUs to be associated with one or more other CPUs. For example, in a configuration in which two CPUs belong to a group sharing an execution pipeline, it may be assumed that the CPUs share other hardware components, so that the retrieval may be reduced for the second CPU.

The process may flow to block 710, where information associated with the CPU may be stored in a PG database, such as the PG database illustrated in FIG. 3.

The process may flow to block 712, where the CPU is added to the PG hierarchy, along with any associated components and relationships. This action may include grouping CPUs or other components based on common characteristics or the defining characteristics. For example, in a PG hierarchy in which the defining characteristic is hardware sharing, CPUs that share a specific hardware component may be grouped together. Groups may be nested, such that groups representing the most sharing of components are nested within other groups representing less sharing. In PG hierarchy 400, the group corresponding to node 434a, which includes CPUs 0-15, share a memory component, while the group corresponding to node 422a, which includes CPUs 0-1, shares an execution pipeline, a connection to an L1 cache, an L1 cache, a connection to an L2 cache, an L2 cache, a connection to memory, and a memory component. Additionally, all of the groups that descend from node 434a, such as the groups corresponding to nodes 432a-b, 430a-b, 428a-d, 426a-d, 424a-h, and 422a-h have the common characteristic of sharing a memory component corresponding to node 434a.

The process may flow to block 714, which represents the end of the loop beginning at block 706. Following the actions of block 714, the process may return to a calling program.

Process 700 may be performed with multiple CPUs or as few as one CPU. For example, when a CPU is added to the system, process 700, or a portion thereof, may be used to add the CPU to an existing PG hierarchy. Though not illustrated, a similar process may be performed to remove a CPU or other component from a PG hierarchy if it is removed from the system.

Figure 8:
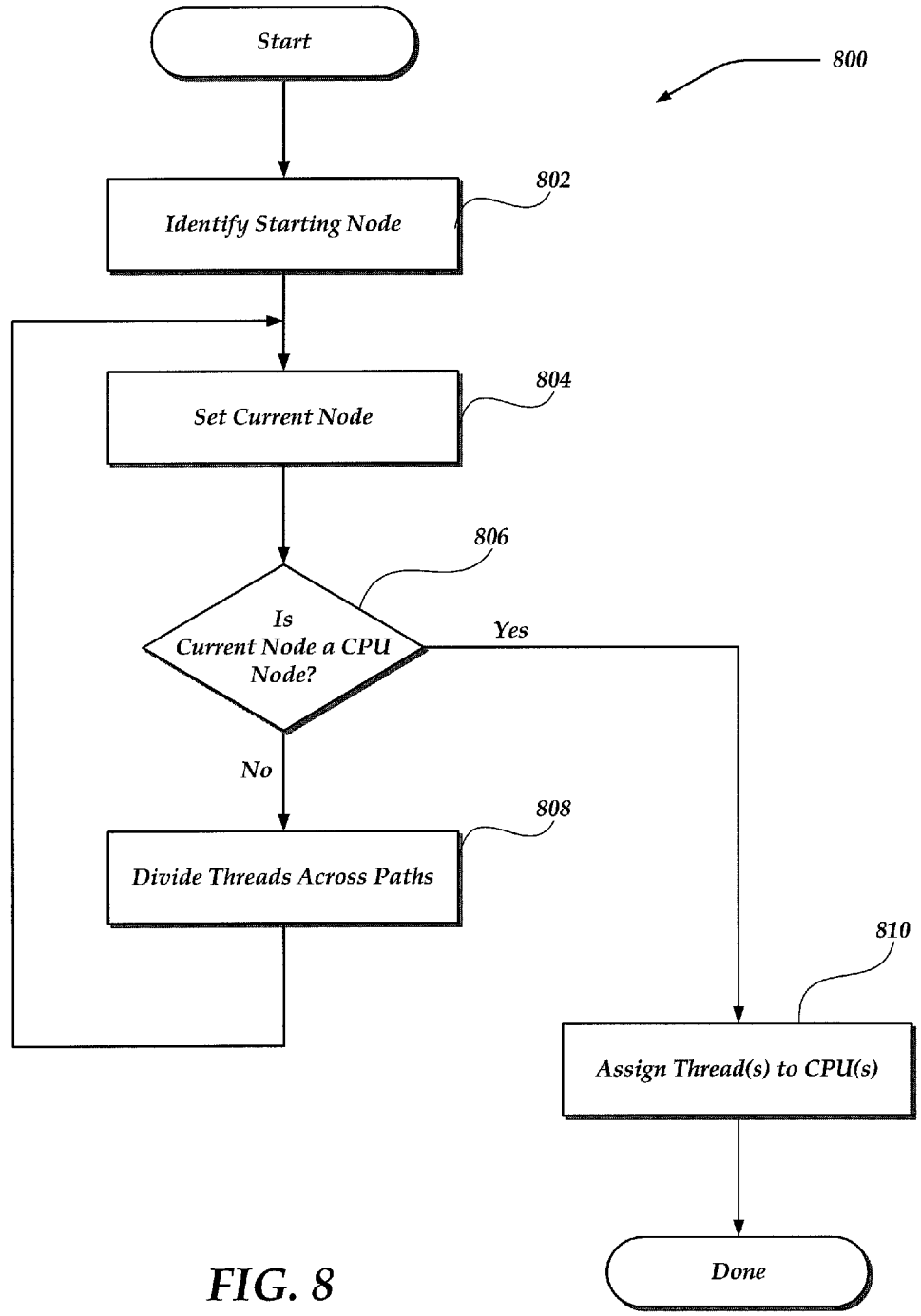
FIG. 8 is a logical flow diagram generally showing one embodiment of a method for load balancing threads.

FIG. 8 is a logical flow diagram generally showing one embodiment of a process 800 for load balancing threads among a plurality of CPUs. Process 800 may employ, configure, or be used in conjunction with, the system 100 of FIG. 1, the system 200 of FIG. 2, or portions thereof.

Process 800 may begin after actions have been performed to initialize data and to create a processor group hierarchy, such as actions described in FIG. 7. In one embodiment, a PG hierarchy such as illustrated in FIG. 5 may be employed. In the discussion that follows, reference is made to PG hierarchy 400 and associated elements of FIG. 5, though various other PG hierarchies having different structures, components, or relationships may be employed. At block 802, process 800 may identify a starting node of the PG hierarchy. In a PG hierarchy having a single root node, such as PG hierarchy 400, the root node may be the starting node. In a PG hierarchy having more than one root node, a new root node may be created as a single root node above the existing nodes. In one implementation, process 800 may select a node in the hierarchy that is not a single root node, or not even a root node at all. Virtually any node above the lowest level may be used as a starting node. For example, in one configuration, factors may constrain one or more threads to be scheduled on CPUs that are associated with level 2 cache 108a of FIG. 1, and the corresponding node 430a may be selected as the starting node for process 800. In the discussion that follows, a starting node of node 436 is assumed.

Process 800 may begin with a designated set of one or more threads to be scheduled on corresponding CPUs 420. As discussed above, the threads to be scheduled may be active threads that are currently assigned to a CPU, and are to be reassigned. At block 804, the starting node is designated as the current node. The current node is a temporary designation, which changes as the process 800 proceeds. At block 806, a determination is made of whether the current node is a CPU node, such as any one of CPU nodes 420. If this determination is negative, the process 800 may proceed to block 808.

At block 808, the set of threads is divided across the paths that descend from the starting node, such as paths 535a and 535b. Each of the descending paths represents a group of CPUs and associated components, and division of the threads across the paths may include one or more load balancing techniques, including techniques discussed herein. Briefly, this may include considering characteristics and loads of individual CPUs or associated components, or aggregate characteristics and loads of each subgroup. It may include considering workload characteristics, such as hardware resource utilization, of each thread. It may also consider additional constraints. The number of paths selected for allocation at block 804 may be as few as one or as many as all of the descending paths, depending on the size of the thread set and other factors.

The actions of blocks 804, 806, and 808 may be recursively repeated for each path having a non-empty allocation. For each such path, the corresponding target node is set to the starting node, the set of threads that are allocated to the current node are considered the thread set, and the actions discussed above for blocks 804, 806, and 808 are performed with respect to the corresponding starting node and the corresponding thread set. In FIG. 5, arrows 535a-b illustrates two selected paths and two new starting nodes for the next recursion. However, there may be any such number greater than or equal to one. In PG hierarchy 400 of FIG. 5, on the recursive iterations of block 804, each of nodes 434a and 434b may respectively become the new current node if there is at least one thread to be allocated to each node. In a configuration where one thread is being load balanced, then exactly one of nodes 434a or 434b may be selected for recursive actions. It is to be noted that in various implementations, the recursive process described herein may be performed in a variety of ways, including stack-based recursion, algorithmic loops, instantiation of objects, or the like.

Process 800 may then repeat with one or more iterations, at each new starting node, dividing the corresponding thread set into the one or more paths that descend from the current node, until for each iteration, the determination at block 806 is negative. That is, a CPU node, such as one of CPU nodes 420, is reached. At this occurrence, a set of one or more threads is associated with the CPU node. Processing may proceed to block 810, where the set of one or more threads is assigned to the CPU corresponding to the CPU node, for example, one of CPUs 122a-d, or other CPUs not illustrated, of FIG. 1. Processing continues until all threads have been assigned. Processing may flow to a done block, where the method returns to a calling program.

Though not described further, herein, other processes of the operating system perform actions to facilitate the execution of threads on CPUs, including maintaining queues for each CPU, blocking, starting, and rescheduling threads, and the like. At a time when one or more threads requires rescheduling, or one or more new threads become ready for scheduling, process 800 may be performed again.

Figure 9:
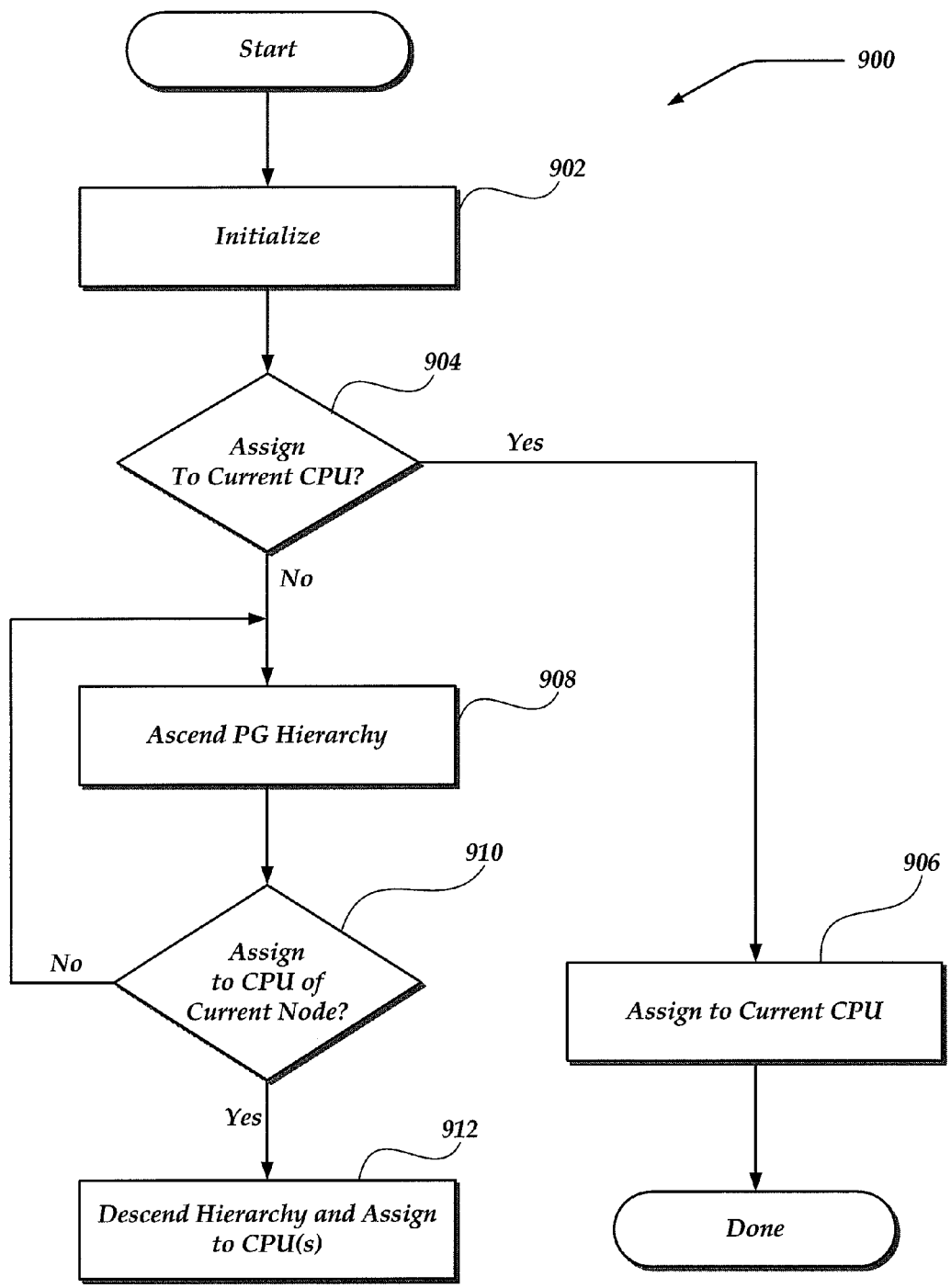
FIG. 9 is a logical flow diagram generally showing one embodiment of a method for scheduling threads based on affinity.

FIG. 9 is a logical flow diagram generally showing one embodiment of a process 900 for assigning a thread to a CPU, based on affinity and component sharing. Process 900 may employ, configure, or be used in conjunction with, the system 100 of FIG. 1, the system 200 of FIG. 2, or portions thereof.

Process 900 may begin after actions have been performed to initialize data and to create a processor group hierarchy, such as actions described in FIG. 7. In one embodiment, a PG hierarchy such as illustrated in FIG. 6 may be employed. In the discussion that follows, reference is made to PG hierarchy 400 and associated elements of FIG. 6, though various other PG hierarchies having different structures, components, or relationships may be employed. At block 902, process 900 performs initialization actions. Initialization may include identifying the thread to be assigned, herein referred to as the assignee thread. Initialization may include identifying a thread and a CPU to which affinity is desired, which may be the CPU where a thread has recently executed or will concurrently execute on the CPU, with respect to the assignee thread. The thread to which affinity is desired is referred to herein as the affinity thread, and the CPU to which affinity is desired is referred to as the affinity CPU. In one embodiment, the affinity thread and the assignee thread may be the same thread, as discussed herein. Initialization may include setting the node corresponding to the affinity CPU as the "current node." In the example system of FIG. 6, CPU 28 may be the affinity CPU, and node 420-28 may be the initial current node.

Process 900 may flow to block 904, where a determination is made of whether the assignee thread is to be assigned to the affinity CPU. As discussed elsewhere herein, this determination may include one or more factors, such as whether the thread has sufficient priority to run on the CPU. If it is determined that the assignee thread is to be assigned to the affinity CPU, the 5 process 900 may flow to block 906, where the thread is assigned to the affinity CPU. The process may then flow to a "done" block and return to a calling program.

If, at block 904, it is determined that the assignee thread is not to be assigned to the affinity CPU, the process may flow to block 908, where the PG hierarchy is ascended to the next node, and this node is set to be the current node. In the example of FIG. 6, the PG hierarchy may be ascended from node 420-28 to node 422o. The new current node has a processor group associated with it, including one or more CPUs. In some situations, the new current node has an identical group of CPUs associated with it. In some situations, the new current node has an associated group of CPUs that is a superset of the previous (child) current node. For example, in FIG. 6, node 422o has a processor group including CPUs 28 and 29, which is a superset of the processor group of CPU 28 associated with node 420-28. Node 424o, which ascends from 422o, has an identical group of CPUs as 422o. In one implementation, process 900 may include an optimization to ascend more than one node at block 908 if the new node does not expand the group of CPUs, or to follow other logic such as ascending to a level corresponding to a designated component.

The process may flow to decision block 910, where a determination is made of whether the assignee thread may execute on, or is desired to execute on, one of the CPUs associated with the current node. As discussed herein, this determination may consider one more factors, including whether the thread has sufficient priority to run on each of the potential CPUs, contention for associated components, or the like.

If, at block 910, it is determined that the assignee thread is not to be assigned to one of the CPUs associated with the current node, the process may loop back to block 908, where the PG hierarchy is ascended one or more nodes, and another determination is made. This loop may be performed as needed, until a node having a desirable CPU is found. In the event that a root node of the PG hierarchy 400 is reached, the determination at block 910 may be forced to select one of the entire set of CPUs. In one implementation, one of the factors considered in the determination at block 910 includes the identity of the current node, such that the root node being the current node outweighs other factors, resulting in a positive determination at block 910.

Upon determining that at least one of the CPUs corresponding to the current node is acceptable, the process 900 may flow to block 912, where the PG hierarchy 400 is descended from the current node, until a CPU is selected. The actions of descending the PG hierarchy may include load balancing decisions or other actions as described with respect to FIG. 8 and process 800. In one example, referring to the PG hierarchy 400 of FIG. 6, the sequence of current nodes evaluated during process 900 may include nodes 420-28, 422o, 424o, 426h, 424p, 422p, and 420-30, resulting in an assignment to CPU 30. A variety of other sequences may also occur. In one embodiment, the process 900 may avoid descending the PG hierarchy a block 912, and select a CPU by other logic, such as randomly among the CPUs that are members of the processor group.

It is to be noted, that the actions of block 912 may include descending to nodes that have been evaluated during the ascent of block 908 and 910. This may occur, for example, in a situation in which the PG sub-groups are determined to be not desirable at block 910, and upon reaching a higher node, it is determined that alternative sub-groups are also not desirable, or even less desirable. Thus, for example, the process may flow from node 422o up to root node 436 in search of a desirable CPU, and then employ load balancing decisions in which it is desirable to flow back to nodes visited during the ascent. It may even be the case that the original (affinity) CPU is found to be the CPU for assigning the thread, though the process may have ascended to a node as high as the root node and back.

Following the actions of block 912, the process may flow to a "done" block, where the method returns to a calling program.

Though process 900 was described above with reference to a single thread to be assigned, in some configurations, the process may be employed with more than one thread. In one implementation, for example, actions of blocks 902-910 may be performed with respect to multiple threads, and subsequent descent and assignment of threads may be performed with multiple threads, such as described in process 800. Other variations may perform actions of process 900 to apply to multiple threads concurrently.

Figure 10:
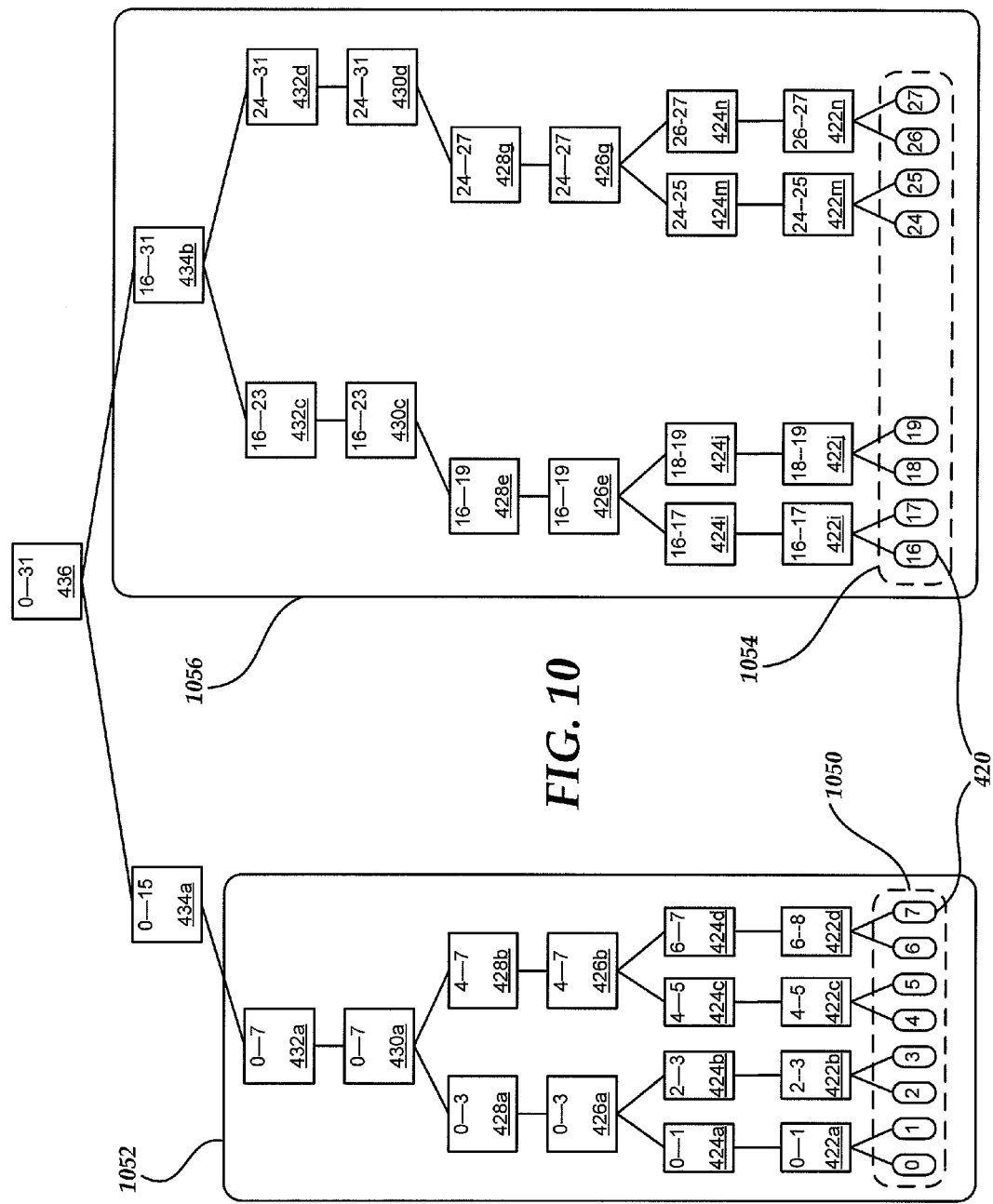
FIG. 10 is a diagram generally showing a processor group hierarchical structure as it may be used in conjunction with a processor set in accordance with an embodiment of the invention.

FIG. 10 illustrates an example of a processor set 1050 used in conjunction with processor groups. Some operating systems may allow a user or an application to designate a set of processors and bind software threads to the set, such that the bound threads are assigned to execute on the designated CPUs. CPUs may be contiguous or non-contiguous. Threads may be identified in any of a number of ways, such as by thread ID, by application, by type, or the like. An operating system may allow a processor set designation to be exclusive, such that threads not bound to the processor set are excluded from assignment to CPUs of the set. In one embodiment, a processor set may be implemented with aspects of the invention. More specifically, a processor set may be implemented by employing a processor group and at least some of the mechanisms discussed herein.

FIG. 10 shows a portion of the PG hierarchy 400 of FIG. 4. Elements of FIG. 10 that are like numbered to those of FIG. 4 have similar characteristics, and the discussion of these elements of FIG. 4 may apply to FIG. 10, unless stated otherwise herein. As illustrated in FIG. 4, processor set 1050 includes the set of CPUs 0-7 (420-0 to 420-7). A PG hierarchy 1052 includes the CPUs of processor set 1050 and nodes corresponding to components that are used by CPUs of processor set 1050. Node 432a is the root node of PG hierarchy 1052. Thus, a processor group corresponding to processor set 1050 includes nodes 432a, 430a, 428a-b, 426a-b, 424a-d, 422a-d, and 420-0 to 420-7. It is to be noted that other PG hierarchies may also be formed with processor set 1050. For example, nodes 428 and 426 may be excluded from a PG hierarchy that has the same processor set 1050.

Process 700, process 800 for load balancing, or process 900 for assigning a thread to a CPU, or other techniques described herein may be employed with PG hierarchy 1052. For example, a load balancing operation may begin at node 432a and descend from there, resulting in threads assigned within the set of CPUs 0-7. Similarly, process 900 may be performed beginning at one of nodes 420-0 to 420-7, considering node 432a as the root node within which the process is restricted.

FIG. 10 illustrates a second processor set 1054, in which the CPUs are not all contiguous. The example processor set 1054 includes CPUs 16-19 and CPUs 24-27. A corresponding PG 1056 includes nodes 434b, 432c, 430c, 428e, 426e, 424i-j, 422i-j, 420-16-19, 432d, 430d, 428g, 426g, 424m-n, 422m-n, and 420-24 to 420-27. It is to be noted that a sub-group descending from node 430c is combined with a sub-group descending from 430d to form PG 1056. Thus, a processor group associated with a processor may be formed in a number of ways and may correspond to any processor set of the processor. As discussed with respect to PG 1052, any of processes 700, 800, 900, or other techniques discussed herein, may be performed with PG 1054. Similarly, in a configuration in which processor set 1050 or 1052 exists as an exclusive processor set, a processor group formed with CPUs outside of either or both of these processor sets may be formed to perform aspects of the invention with the remaining CPUs. It is to be noted that an exclusive processor set may have one or more associated PG group hierarchies.

It will be understood that each block of the flowchart illustrations of FIGS. 7-9, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented method such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing a plurality of threads in a processor having a plurality of processing units (PUs), comprising:
    a) a processor configuration manager configured to:
        retrieve information descriptive of components of the processors; and
        create a graph structure including a plurality of nodes, wherein the graph structure is representative of at least a portion of the information; and
    b) a thread scheduler configured to:
        identify a first thread of the plurality of threads to be assigned;
        identify an affinity PU, wherein the first thread has an affinity with the affinity PU, and wherein the affinity PU is one of the plurality of nodes;
        set the identified affinity PU as a current node;
        make a first determination, using the information, that the first thread may not be assigned to the affinity PU;
        set a parent node of the affinity PU as the current node, wherein the parent node comprises a plurality of child nodes, wherein a first child node of the plurality of child nodes is the affinity PU;
        make a second determination, using the information, that the first thread may be assigned to at least one of the plurality of child nodes;
        set a second child node of the plurality of child nodes as the current node in response to the second determination, wherein the second child node is a non-affinity PU; and
        assign the first thread to the non-affinity PU in response to a third determination that the first thread may be assigned to the non-affinity PU.

2. The system of claim 1, wherein the graph structure is a directed acyclic graph.

3. The system of claim 1, wherein the thread scheduler balances a load across the processing units by descending the graph structure from one or more nodes representative of a low amount of component sharing toward one or more nodes representative of a high amount of component sharing.

4. The system of claim 1, wherein the thread scheduler assigns a second thread of the plurality of threads to a processing unit based on an affinity of the second thread with a third thread of the plurality of threads.

5. The system of claim 1, wherein the thread scheduler assigns a second thread of the plurality of threads to a processing unit based on an affinity of the second thread with itself, based on at least one sharing relationship between components.

6. The system of claim 1, wherein the thread scheduler selectively traverses the structure to a node corresponding to a cache, and selectively associates a second thread of the plurality of threads with a first processing unit that shares the cache with a second processing unit, the thread having an affinity with the second processing unit, the structure representative of the first processing unit and second processing unit sharing the cache.

7. The system of claim 1, wherein the thread scheduler assigns a second thread of the plurality of threads to a first processing unit based on an affinity of the second thread with a second processing unit, by ascending the graph structure from a first node representative of an amount of component sharing to a second node representative of a lower amount of component sharing.

8. The system of claim 1, wherein the thread scheduler ascends the graph structure to a node based on an affinity with a processing unit, and descends the graph structure from the node based on load balancing.

9. The system of claim 1, wherein the system employs a NUMA architecture.

10. A computer-based method of assigning a thread to a processing unit (PU) in a processor having a plurality of PUs, comprising:
   a) creating a graph structure representative of relationships between components of the processor, the graph structure including a plurality of nodes;
   b) identifying a first thread to be assigned and an affinity PU, wherein the first thread has a first affinity with the affinity PU, and wherein the affinity PU is one of the plurality of nodes;
   c) setting the identified affinity PU as a current node;
   d) making a first determination, using the graph structure, that the first thread may not be assigned to the affinity PU;
   e) setting a parent node of the affinity PU as the current node, wherein the parent node comprises a plurality of child nodes, wherein a first child node of the plurality of child nodes is the affinity PU;
   f) making a second determination, using the graph structure, that the first thread may be assigned to at least one of the plurality of child nodes;
   g) setting a second child node of the plurality of child nodes as the current node in response to the second determination, wherein the second child node is a non-affinity PU; and
   h) assigning the first thread to the non-affinity PU in response to a third determination that the first thread may be assigned to the non-affinity PU.

11. The method of claim 10, further comprising:
assigning a second thread by ascending the graph structure in a path direction toward a first node, the path based on a second affinity between the thread and another processing unit.

12. The method of claim 10, further comprising:
   i) retrieving data descriptive of the relationships between components and characteristics of the plurality of processing units; and
   j) assigning a second thread to a processing unit by determining a path along the graph structure from another processing unit to the processing unit based on a second affinity of the second thread with the other processing unit and on the component relationships represented by the graph structure; wherein the graph structure is a directed graph structure having a plurality of levels, each level corresponding to a class of components.

13. The method of claim 10, further comprising determining setting the second child node based on a priority of the first thread.

14. The method of claim 10, further comprising traversing the graph in a path determined by a second affinity between the thread and another processing unit and a load on a plurality of the processing units.

15. A non-transitory computer readable medium comprising instructions for managing threads and processing units in a processor having a plurality of processing units (PUs), wherein the instructions, when executed, perform a method, the method comprising:
   a) creating a graph structure representative of relationships between components of the processor, the graph structure including a plurality of nodes;
   b) identifying a first thread to be assigned and an affinity PU, wherein the first thread has a first affinity with the affinity PU, and wherein the affinity PU is one of the plurality of nodes;
   c) setting the identified affinity PU as a current node;
   d) making a first determination, using the graph structure, that the first thread may not be assigned to the affinity PU;
   e) setting a parent node of the affinity PU as the current node, wherein the parent node comprises a plurality of child nodes, wherein a first child node of the plurality of child nodes is the affinity PU;
   f) making a second determination, using the graph structure, that the first thread may be assigned to at least one of the plurality of child nodes;
   g) setting a second child node of the plurality of child nodes as the current node in response to the second determination, wherein the second child node is a non-affinity PU; and
   h) assigning the first thread to the non-affinity PU in response to a third determination that the first thread may be assigned to the non-affinity PU.

16. The system of claim 15, wherein the graph structure is created by creating a directed graph having at least three levels, each level corresponding to a class of components.

17. The system of claim 15, further comprising:
   i) assigning a second thread by ascending the graph structure from the second child node corresponding to the non-affinity PU and descending the graph structure to the first child node corresponding to the affinity PU, the second thread having a second affinity with the non-affinity PU.

18. The system of claim 15, further comprising:
   i) assigning a second thread by descending the graph structure from a first node representative of an amount of component sharing to a second node representative of a higher amount of component sharing, the second node corresponding to the affinity PU.

19. The system of claim 15, further comprising:
   i) assigning a second thread by traversing the graph structure to determine a traversal path based on another processing unit on which the second thread has recently executed.

20. The system of claim 15, further comprising:
   i) assigning a second thread by traversing the graph structure to determine a traversal path based on another processing unit on which a third thread has recently executed.

* * * * *